(12) United States Patent
Xin et al.

(10) Patent No.: US 12,538,333 B2
(45) Date of Patent: Jan. 27, 2026

(54) MULTICAST INFORMATION RECEIVING METHOD, INDICATION INFORMATION SENDING/RECEIVING METHOD, AND RELATED APPARATUS

(71) Applicant: Huawei Technologies Co., Ltd., Shenzhen (CN)

(72) Inventors: Tingyu Xin, Shenzhen (CN); Bingzhao Li, Beijing (CN); Lei Chen, Beijing (CN); Haifeng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 17/994,747

(22) Filed: Nov. 28, 2022

(65) Prior Publication Data
US 2023/0090851 A1 Mar. 23, 2023

Related U.S. Application Data

(63) Continuation of application No. PCT/CN2021/083929, filed on Mar. 30, 2021.

(30) Foreign Application Priority Data

May 28, 2020 (CN) .......................... 202010469434.1

(51) Int. Cl.
*H04H 20/71* (2008.01)
*H04L 5/00* (2006.01)
(Continued)

(52) U.S. Cl.
CPC ........... *H04W 72/30* (2023.01); *H04L 5/0053* (2013.01); *H04W 4/06* (2013.01); *H04W 48/10* (2013.01);
(Continued)

(58) Field of Classification Search
CPC ....... H04W 72/30; H04W 4/06; H04W 48/10; H04W 72/0453; H04W 48/12;
(Continued)

(56) References Cited

U.S. PATENT DOCUMENTS

2012/0269110 A1 10/2012 Walker et al.
2016/0044634 A1 2/2016 Seo et al.
(Continued)

FOREIGN PATENT DOCUMENTS

| CN | 107889238 A | 4/2018 |
| CN | 108282749 A | 7/2018 |

(Continued)

OTHER PUBLICATIONS

"3rd Generation Partnership Project; Technical Specification Group Radio Access Network; NR; NR and NG-RAN Overall Description; Stage 2, (Release 16)", 3GPP TS 38.300 V16.1.0, Technical Specification, Mar. 2020, 133 Pages.
(Continued)

*Primary Examiner* — Chuong T Ho
(74) *Attorney, Agent, or Firm* — Slater Matsil, LLP

(57) ABSTRACT

This application provides a multicast information receiving method, an indication information sending/receiving method, and a related apparatus. The method includes: A first terminal apparatus receives first indication information from a network device; determines a first bandwidth of a first bandwidth part BWP based on the first indication information, where the first BWP is for receiving first multicast information, and the first bandwidth is a bandwidth configured in a master information block MIB or a system information block SIB1; and receives the first multicast information on the first bandwidth.

21 Claims, 7 Drawing Sheets

(51) Int. Cl.
*H04W 4/06* (2009.01)
*H04W 48/10* (2009.01)
*H04W 72/0453* (2023.01)
*H04W 72/30* (2023.01)
*H04L 12/18* (2006.01)

(52) U.S. Cl.
CPC ....... *H04W 72/0453* (2013.01); *H04L 12/189* (2013.01)

(58) Field of Classification Search
CPC ............. H04W 72/23; H04W 72/0457; H04W 72/231; H04L 5/0053; H04L 12/189; Y02D 30/70
USPC ......................................................... 370/312
See application file for complete search history.

(56) References Cited

U.S. PATENT DOCUMENTS

| | | | |
|---|---|---|---|
| 2018/0288746 A1 | 10/2018 | Zhang et al. | |
| 2019/0053029 A1* | 2/2019 | Agiwal | H04W 48/12 |
| 2019/0165915 A1 | 5/2019 | John Wilson et al. | |
| 2020/0045708 A1 | 2/2020 | Hwang et al. | |
| 2020/0137741 A1 | 4/2020 | Zhou et al. | |
| 2020/0137745 A1 | 4/2020 | Bachu et al. | |
| 2021/0168810 A1* | 6/2021 | Chen | H04W 72/53 |
| 2021/0212013 A1* | 7/2021 | Chen | H04W 60/02 |
| 2021/0258223 A1* | 8/2021 | Rico | H04W 72/30 |
| 2022/0338070 A1* | 10/2022 | Wang | H04W 48/16 |
| 2022/0361122 A1* | 11/2022 | Zheng | H04L 5/0098 |
| 2023/0029998 A1* | 2/2023 | Narayanan Thangaraj | H04W 4/06 |
| 2023/0040690 A1* | 2/2023 | Chen | H04L 5/0053 |

FOREIGN PATENT DOCUMENTS

| | | |
|---|---|---|
| CN | 109302718 A | 2/2019 |
| CN | 109392139 A | 2/2019 |
| CN | 110324132 A | 10/2019 |
| CN | 110475294 A | 11/2019 |
| CN | 110831126 A | 2/2020 |
| CN | 111132324 A | 5/2020 |
| JP | 2018110389 A | 7/2018 |
| JP | 2020504485 A | 2/2020 |
| TW | 202014003 A | 4/2020 |
| WO | 2018063080 A1 | 4/2018 |
| WO | 2018074552 A1 | 4/2018 |
| WO | 2019096994 A1 | 5/2019 |
| WO | 2019192419 A1 | 10/2019 |
| WO | 2020009144 A1 | 1/2020 |
| WO | 2020029746 A1 | 2/2020 |
| WO | 2020055191 A1 | 3/2020 |
| WO | 2020090092 A1 | 5/2020 |

OTHER PUBLICATIONS

"3rd Generation Partnership Project; Technical Specification Group Radio Access Network; NR; Physical layer procedures for control, (Release 16)", 3GPP TS 38.213 V16.1.0, Technical Specification. Mar. 2020, 156 Pages.

"3rd Generation Partnership Project; Technical Specification Group Radio Access Network; NR; Radio Resource Control (RRC) protocol specification, (Release 16)", 3GPP TS 38.331 V16.0.0, Technical Specification, Mar. 2020, 835 Pages.

"3rd Generation Partnership Project; Technical Specification Group Radio Access Network; NR; Physical channels and modulation (Release 16)", 3GPP TS 38.211 V16.1.0, Technical Specification, (Mar. 2020), 130 Pages.

"3rd Generation Partnership Project; Technical Specification Group Radio Access Network; NR; Multiplexing and channel coding (Release 16)", 3GPP TS 38.212 V16.1.0, Technical Specification, (Mar. 2020), 146 Pages.

TSG RAN WG2, "LS on supported BW for inital BWP", 3GPP TSG RAN WG1 #98, R1-1908010, Aug. 26-30, 2019, Prague, CZ, 3GPP TSG-RAN WG2 Meeting #106, R2-1908301, May 13-17, 2019, Reno, USA. 2 Pages.

3GPP TSG-RAN WG4 Meeting #92bis, R4-xxxxxxx, "RAN4 #92 Meeting report", Chongqing, China, Oct. 14-18, 2019, total 936 pages.

* cited by examiner

MULTICAST INFORMATION RECEIVING METHOD, INDICATION INFORMATION SENDING/RECEIVING METHOD, AND RELATED APPARATUS

CROSS-REFERENCE TO RELATED APPLICATIONS

This application is a continuation of International Application No. PCT/CN2021/083929, filed on Mar. 30, 2021, which claims priority to Chinese Patent Application No. 202010469434.1, filed on May 28, 2020. The disclosures of the aforementioned applications are hereby incorporated by reference in their entireties.

TECHNICAL FIELD

This application relates to the field of communication technologies, and in particular, to a multicast information receiving method, an indication information sending/receiving method, and a related apparatus.

BACKGROUND

A multimedia broadcast multicast service (MBMS) or a multicast broadcast service (MBS) is a service, for example, live broadcast and scheduled program playing, oriented to a plurality of terminal apparatuses (UEs). A multicast transmission technology is a technology in which a network device (for example, a base station) simultaneously sends services to a plurality of terminal apparatuses. The MBMS is from a data server. For example, the data server first sends MBMS data to a core network device, the core network device then sends the MBMS data to the base station, and finally the base station sends the MBMS data to UE that receives the MBMS.

A bandwidth part (BWP) is a new concept proposed in a new radio (NR) protocol, and is a part of a system bandwidth. The BWP is a segment of continuous bandwidth resources configured by a network side (for example, a gNodeB) for the UE, so that bandwidths on the network side and a UE side can be flexibly configured. For example, because bandwidths supported in an NR system are high, compared with a maximum bandwidth of 20 MHz supported in a long term evolution (LTE) system, a maximum bandwidth in the NR system may reach 100 MHz (FR1) and 400 MHz (FR2). For the UE, a higher supported bandwidth indicates a higher requirement for UE performance, and costs of the UE increase accordingly. Therefore, it is proposed to use the BWP in the NR system, to control costs and power consumption of the UE.

The network device may configure the BWP for the UE by using a master information block (MIB), a system information block (SIB), or in another manner. Currently, for UE in some states (for example, an idle state), bandwidths configured by the network device cannot satisfy requirements for MBMS reception by the UE.

SUMMARY

Embodiments of this application provide a multicast information receiving method, an indication information sending/receiving method, and a related apparatus, to resolve a problem that a bandwidth of a BWP configured by a network device for UE in some states is low and cannot satisfy requirements for multicast service reception by the UE.

According to a first aspect, an embodiment of this application provides a multicast information receiving method. The method includes: A first terminal apparatus receives first indication information from a network device; determines a first bandwidth of a first bandwidth part BWP based on the first indication information, where the first BWP is for receiving first multicast information, and the first bandwidth is a bandwidth configured in a master information block MIB or a system information block SIB1; and receives the first multicast information on the first bandwidth.

Based on the foregoing design, after receiving the first indication information, the first terminal apparatus may determine, based on the first indication information, that the first bandwidth of the first BWP is a bandwidth of an initial BWP configured in the SIB1 or the MIB, so that the first terminal apparatus may receive the first multicast information by using the bandwidth configured in the SIB1 by the network device or the bandwidth configured in the MIB by the network device. This solution is applicable to a scenario in which the first terminal apparatus is in a non-connected state (for example, an idle state or an inactive state). A specific state of the non-connected state of the first terminal apparatus is not limited in this application. Based on the solution, bandwidth parameters can be flexibly configured for the first terminal apparatus in the non-connected state for multicast information reception. When the first indication information indicates that the first bandwidth is the bandwidth configured in the SIB1, the first terminal apparatus may receive the multicast information by using a relatively high bandwidth, to satisfy requirements for multicast service transmission.

In a possible design, that the first terminal apparatus determines the first bandwidth of the first BWP based on the first indication information includes: The first indication information indicates that if a bandwidth of a first control resource set CORESET is greater than a bandwidth of a CORESET0, the first terminal apparatus determines that the first bandwidth is the bandwidth configured in the SIB1; or if the first indication information indicates that a bandwidth of a first CORESET is less than or equal to a bandwidth of a CORESET0, the first terminal apparatus determines that the first bandwidth is the bandwidth configured in the MIB, where the first CORESET is configured in system information.

Based on the foregoing design, the first terminal apparatus may determine, based on the bandwidth of the first CORESET, that the first bandwidth of the first BWP is the bandwidth of the initial BWP configured in the SIB1 or the MIB, so that the first multicast information can be received on the bandwidth of the initial BWP configured in the SIB1 or the MIB. This can increase the bandwidth for multicast information reception by the first terminal apparatus, and further satisfy requirements for multicast service transmission.

In a possible design, that the first terminal apparatus determines the first bandwidth of the first bandwidth part BWP based on the first indication information includes: The first indication information includes a correspondence between the first multicast information and a receive bandwidth or between intra-cell multicast information and a receive bandwidth, and the first terminal apparatus determines, based on the first indication information, that the first bandwidth is the bandwidth configured in the MIB or the SIB1.

Based on the foregoing design, the first terminal apparatus may determine, based on the correspondence between the intra-cell multicast information and the receive bandwidth and the first multicast information that the first terminal apparatus is interested in or is receiving, that the first bandwidth of the first BWP is the bandwidth of the initial BWP configured in the SIB1 or the MIB, so that the first terminal apparatus can receive or continue to receive the first multicast information on the bandwidth of the initial BWP configured in the SIB1 or the MIB. This can increase the bandwidth for multicast information reception by the first terminal apparatus, and further satisfy requirements for multicast service transmission.

According to a second aspect, an embodiment of this application provides a multicast information receiving method. The method includes: A network device sends first indication information to a first terminal apparatus, where the first indication information is for determining a first bandwidth of a first BWP, the first BWP is for receiving first multicast information, and the first bandwidth is a bandwidth configured in a master information block MIB or a system information block SIB1.

Based on the foregoing design, the network device may send the first indication information to the first terminal apparatus, to indicate that the first bandwidth of the first BWP used to receive the first multicast information by the first terminal apparatus may be the bandwidth of the initial BWP configured in the SIB1 or the MIB, so that the first terminal apparatus may determine, based on the received first indication information, to receive the first multicast information on the bandwidth of the initial BWP configured in the SIB1 or the MIB. This solution is applicable to a scenario in which the first terminal apparatus is in a non-connected state. A specific state of the non-connected state of the first terminal apparatus is not limited in this application. Based on the solution, bandwidth parameters can be flexibly configured for the first terminal apparatus in the non-connected state for multicast information reception, to further satisfy requirements for multicast service transmission.

In a possible design, the first indication information indicates that if a bandwidth of a first control resource set CORESET is greater than a bandwidth of a CORESET0, the first bandwidth is the bandwidth configured in the SIB1; or if the first indication information indicates that a bandwidth of a first CORESET is less than or equal to a bandwidth of a CORESET0, the first bandwidth is the bandwidth configured in the MIB, where the first CORESET is configured in system information.

Based on the foregoing design, the network device may indicate, based on the bandwidth of the first CORESET, that the first bandwidth of the first BWP used to receive the first multicast information by the first terminal apparatus is the bandwidth of the initial BWP configured in the SIB1 or the MIB, so that the first terminal apparatus may determine, based on the received bandwidth of the first CORESET, that the first bandwidth of the first BWP is the bandwidth of the initial BWP configured in the SIB1 or the MIB, and receive the first multicast information on the bandwidth of the initial BWP configured in the SIB1 or the MIB. This can increase the bandwidth for multicast information reception by the first terminal apparatus, and further satisfy requirements for multicast service transmission.

In a possible design, the first indication information includes a correspondence between the first multicast information and a receive bandwidth or between intra-cell multicast information and a receive bandwidth.

Based on the foregoing design, the network device may indicate, based on the correspondence between the intra-cell multicast information and the receive bandwidth, the first terminal apparatus that the first bandwidth of the first BWP is the bandwidth of the initial BWP configured in the SIB1 or the MIB, so that the first terminal apparatus may determine, based on the correspondence between the intra-cell multicast information and the receive bandwidth and the first multicast information that the first terminal apparatus is interested in or is receiving, that the first bandwidth of the first BWP is the bandwidth of the initial BWP configured in the SIB1 or the MIB, and receive the first multicast information on the bandwidth of the initial BWP configured in the SIB1 or the MIB. This can increase the bandwidth for multicast information reception by the first terminal apparatus, and further satisfy requirements for multicast service transmission.

According to a third aspect, an embodiment of this application provides an indication information receiving method. The method includes: A first terminal apparatus receives second indication information from a network device, where the second indication information indicates the first terminal apparatus to use a first bandwidth or a second bandwidth after the first terminal apparatus enters a connected state, the first bandwidth is a bandwidth of an initial BWP configured in a SIB1, and the second bandwidth is a bandwidth configured to receive multicast information and is configured in the SIB1; and determines, based on the second indication information, that the bandwidth of the initial BWP is the first bandwidth or the second bandwidth.

Based on the foregoing design, after receiving the second indication information, the first terminal apparatus may determine the bandwidth of the initial BWP based on the second indication information, so that after entering the connected state, when receiving the multicast information, the first terminal apparatus may receive the multicast information on the second bandwidth configured to receive the multicast information. The second bandwidth may be configured in the SIB1, other system information, or a multicast logical channel. The second bandwidth is a bandwidth for multicast information reception, or a bandwidth used when the first terminal apparatus receives the multicast information. Therefore, after entering the connected state, the first terminal apparatus may receive service information by pertinently using a corresponding bandwidth. This can improve resource utilization, better satisfy requirements for multicast service reception by the first terminal apparatus, and avoid a resource waste caused, by using the second bandwidth configured to receive the multicast information, by the first terminal apparatus that does not receive the multicast information.

In a possible design, the method further includes: Before receiving the second indication information, the first terminal apparatus sends third indication information to the network device, where the third indication information indicates whether the first terminal apparatus receives the multicast information.

Based on the foregoing design, the first terminal apparatus may send the third indication information to the network device, to indicate whether the first terminal apparatus receives the multicast information, so that the network device can pertinently send the second indication information to the first terminal apparatus based on the third indication information.

According to a fourth aspect, an embodiment of this application provides an indication information sending method. The method includes: A network device sends second indication information to a first terminal apparatus, where the second indication information indicates the first terminal apparatus to use a first bandwidth or a second bandwidth after the first terminal apparatus enters a connected state, the first bandwidth is a bandwidth of an initial BWP configured in a SIB1, and the second bandwidth is a bandwidth configured to receive multicast information and is configured in the SIB1.

Based on the foregoing design, the network device may send the second indication information to the first terminal apparatus, to indicate the first terminal apparatus to use the first bandwidth or the second bandwidth after the first terminal apparatus enters the connected state, so that the first terminal apparatus may determine, based on the second indication information, to use the second bandwidth when the first terminal apparatus receives the multicast information after entering the connected state. The second bandwidth may be configured in the SIB1, other system information, or a multicast logical channel. The second bandwidth is a bandwidth for multicast information reception, or a bandwidth used when the first terminal apparatus receives the multicast information, or the first bandwidth used when the first terminal apparatus determines that the first terminal apparatus receives unicast information after entering the connected state, that is, does not receive the multicast information. This can improve resource utilization, better satisfy requirements for multicast service reception by the first terminal apparatus, and avoid a resource waste caused, by using the second bandwidth configured to receive multicast information, by the first terminal apparatus that does not receive the multicast information.

In a possible design, the method further includes: Before sending the second indication information, the network device receives third indication information from the first terminal apparatus, where the third indication information indicates whether the first terminal apparatus receives the multicast information.

Based on the foregoing design, the network device may determine, based on the third indication information, whether the first terminal apparatus receives the multicast information, to pertinently send the second indication information to the first terminal apparatus.

According to a fifth aspect, an embodiment of this application provides a communication apparatus. The apparatus includes:
  a transceiver unit, configured to receive first indication information from a network device; and determine a first bandwidth of a first bandwidth part BWP based on the first indication information, where the first BWP is for receiving first multicast information, and the first bandwidth is a bandwidth configured in a MIB or a SIB1; and
  a processing unit, configured to receive the first multicast information on the first bandwidth.

In a possible design, when determining the first bandwidth of the first BWP based on the first indication information, the transceiver unit is specifically configured to: if the first indication information indicates that a bandwidth of a first CORESET is greater than a bandwidth of a CORESET0, determine that the first bandwidth is the bandwidth configured in the SIB1; or if the first indication information indicates that a bandwidth of a first CORESET is less than or equal to a bandwidth of a CORESET0, determine that the first bandwidth is the bandwidth configured in the MIB, where the first CORESET is configured in system information.

In a possible design, when determining the first bandwidth of the first BWP based on the first indication information, the transceiver unit is specifically configured to: determine, based on the first indication information, that the first bandwidth is the bandwidth configured in the MIB or the SIB1, where the first indication information includes a correspondence between the first multicast information and a receive bandwidth or between intra-cell multicast information and a receive bandwidth.

For beneficial effects of the fifth aspect and the possible designs of the fifth aspect, refer to descriptions of the beneficial effects of the method according to any one of the first aspect and the possible designs of the first aspect.

According to a sixth aspect, an embodiment of this application provides a communication apparatus. The apparatus includes:
  a transceiver unit, configured to send first indication information to a first terminal apparatus, where the first indication information is for determining a first bandwidth of a first BWP, the first BWP is for receiving first multicast information, and the first bandwidth is a bandwidth configured in a master information block MIB or a system information block SIB1.

In a possible design, the first indication information indicates that if a bandwidth of a first control resource set CORESET is greater than a bandwidth of a CORESET0, the first bandwidth is the bandwidth configured in the SIB1; or if the first indication information indicates that a bandwidth of a first CORESET is less than or equal to a bandwidth of a CORESET0, the first bandwidth is the bandwidth configured in the MIB, where the first CORESET is configured in system information.

In a possible design, the first indication information includes a correspondence between the first multicast information and a receive bandwidth or between intra-cell multicast information and a receive bandwidth.

For beneficial effects of the sixth aspect and the possible designs of the sixth aspect, refer to descriptions of the beneficial effects of the method according to any one of the second aspect and the possible designs of the second aspect.

According to a seventh aspect, an embodiment of this application provides a communication apparatus. The apparatus includes:
  a transceiver unit, configured to receive second indication information from a network device, where the second indication information indicates a first terminal apparatus to use a first bandwidth or a second bandwidth after the first terminal apparatus enters a connected state, the first bandwidth is a bandwidth of an initial BWP configured in a SIB1, and the second bandwidth is a bandwidth configured to receive multicast information and is configured in the SIB1; and
  a processing unit, configured to determine, based on the second indication information, that the bandwidth of the initial BWP is the first bandwidth or the second bandwidth.

In a possible design, the transceiver unit is further configured to: before receiving the second indication information, send third indication information to the network device, where the third indication information indicates whether the first terminal apparatus receives the multicast information.

For beneficial effects of the seventh aspect and the possible designs of the seventh aspect, refer to descriptions of the beneficial effects of the method according to any one of the third aspect and the possible designs of the third aspect.

According to an eighth aspect, an embodiment of this application provides a communication apparatus. The apparatus includes:
  a transceiver unit, configured to send second indication information to a first terminal apparatus, where the second indication information indicates the first terminal apparatus to use a first bandwidth or a second bandwidth after the first terminal apparatus enters a connected state, the first bandwidth is a bandwidth of an initial BWP configured in a SIB1, and the second bandwidth is a bandwidth configured to receive multicast information and is configured in the SIB1.

In a possible design, the transceiver unit is further configured to: before sending the second indication information, receive third indication information from the first terminal apparatus, where the third indication information indicates whether the first terminal apparatus receives the multicast information.

For beneficial effects of the eighth aspect and the possible designs of the eighth aspect, refer to descriptions of the beneficial effects of the method according to any one of the fourth aspect and the possible designs of the fourth aspect.

According to a ninth aspect, an embodiment of this application provides a computer-readable storage medium or a non-volatile storage medium, where the computer-readable storage medium or the non-volatile storage medium stores computer instructions or a computer program. When the computer instructions or the computer program are or is run on a computer, the computer is enabled to perform the method according to any one of the first aspect to the fourth aspect, or when the computer instructions or the computer program are or is run on one or more processors, a communication apparatus including the one or more processors is enabled to perform the method according to any one of the first aspect to the fourth aspect.

According to a tenth aspect, an embodiment of this application provides a computer program product. The computer program product is configured to store a computer program. When the computer program is run on a computer, the computer is enabled to perform the method according to any one of the first aspect to the fourth aspect.

According to an eleventh aspect, an embodiment of this application provides a chip or an indication information transmission apparatus, including at least one processor. The at least one processor is coupled to a memory. The memory is configured to store computer instructions, and the at least one processor runs the computer instructions to enable the chip or the indication information transmission apparatus to perform the method according to any one of the first aspect to the fourth aspect.

According to a twelfth aspect, an embodiment of this application provides a chip, including at least one processor and an interface. The interface may be a code/data read/write interface, the interface is configured to provide computer instructions (the computer instructions are stored in a memory, and may be directly read from the memory, or may pass through another component) for the at least one processor, and the at least one processor is configured to execute the computer instructions, to implement the method according to any one of the first aspect to the fourth aspect.

According to a thirteenth aspect, an embodiment of this application provides a communication apparatus, where the communication apparatus includes one or more processors, and one or more memories or non-volatile storage media. The one or more processors are connected to the one or more memories or non-volatile storage media, and the one or more memories or non-volatile storage media store computer instructions or a computer program. When the one or more processors execute the computer instructions or the computer program, the communication apparatus is enabled to perform the methods according to the first aspect to the fourth aspect.

According to a fourteenth aspect, an embodiment of this application provides a first terminal apparatus or a communication apparatus, configured to perform the method according to the first aspect or the third aspect, or the steps performed by the first terminal apparatus or the communication apparatus in the solutions provided in embodiments of this application.

According to a fifteenth aspect, an embodiment of this application provides a network device or a communication apparatus, configured to perform the method according to the second aspect or the fourth aspect, or the steps performed by the network device or the communication apparatus in the solutions provided in embodiments of this application.

According to a sixteenth aspect, an embodiment of this application provides a communication system. The communication system includes the communication apparatus in the fifth aspect and the communication apparatus in the sixth aspect, and/or includes the communication apparatus in the seventh aspect and the communication apparatus in the eighth aspect.

DETAILED DESCRIPTION OF ILLUSTRATIVE EMBODIMENTS

To make the purpose, technical solutions, and advantages of this application clearer, the following describes the technical solutions of embodiments of this application in detail with reference to the accompanying drawings in embodiments of this application.

Figure 1:
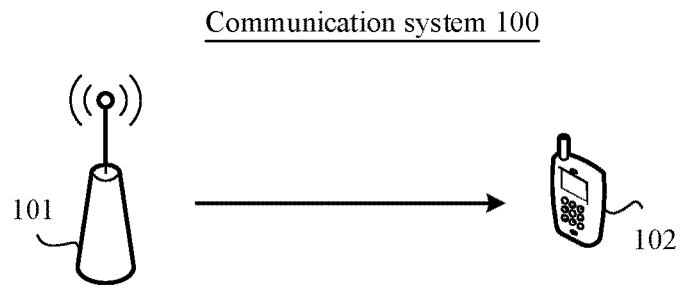
FIG. 1 is a schematic diagram of a communication system according to an embodiment of this application.

FIG. 1 is a schematic diagram of a communication system to which an embodiment of this application may be applied.

The communication system 100 may include a network device 101 and a first terminal apparatus 102.

It should be understood that the communication system 100 provided in this embodiment of this application is applicable to both a low-frequency scenario (sub 6G) and a high-frequency scenario (above 6G). An application scenario of the communication system 100 provided in this embodiment of this application includes but is not limited to a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, a new radio (NR) communication system, or the like.

It should be understood that, in this embodiment of this application, the network device 101 includes but is not limited to an access network (access network, AN) device, a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, or the like, and may be a device that communicates with the first terminal apparatus 102 over an air interface by using one or more cells in an access network. The network device 101 may be configured to mutually convert a received over-the-air frame and an Internet Protocol (IP) packet, and serve as a router between the first terminal apparatus 102 and a rest portion of the access network, where the rest portion of the access network may include an IP network. The network device 101 may further coordinate attribute management of the air interface. For example, the network device 101 may include an evolved NodeB (NodeB, eNB, or e-NodeB, evolved NodeB) in a long term evolution (LTE) system or an LTE-advanced (LTE-A) system, may include a next generation NodeB (gNB) in a 5G NR system, or may include a central unit (CU) and a distributed unit (DU) in a cloud radio access network (CloudRAN) system. This is not limited in embodiments of this application.

It should be understood that, in this embodiment of this application, the first terminal apparatus 102 may be an apparatus having a wireless transceiver function, and may be deployed on land, including an indoor apparatus, an outdoor apparatus, a handheld apparatus, or a vehicle-mounted apparatus; or may be deployed on water (for example, on a ship); or may be deployed in the air (for example, on an airplane, a balloon, or a satellite). The first terminal apparatus 102 can communicate with one or more network devices in one or more communication systems, and receive network services provided by the network device 101. For example, the first terminal apparatus 102 in this embodiment of this application may be a mobile phone (or referred to as a "cellular" phone), a session initiation protocol (SIP) phone, a wireless local loop (WLL) station, a personal digital assistant (PDA), a computer with a mobile terminal, or the like. The first terminal apparatus 102 may further be user equipment (UE), a terminal, a mobile station (MS), a mobile phone, a tablet computer (pad), a computer having the wireless transceiver function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. Alternatively, the first terminal apparatus 102 may be a communication chip having a communication module.

It should be understood that, in the communication system shown in FIG. 1, an example in which the network device 101 communicates with a single first terminal apparatus 102 is used. In a specific implementation process, the network device 101 may communicate with a plurality of first terminal apparatuses 102. The plurality of first terminal apparatuses 102 may be in a same cell, or may be in different cells. This is not specifically limited in this embodiment of this application.

It should be understood that, in this embodiment of this application, the network device 101 and the first terminal apparatus 102 may directly communicate with each other, or may communicate with each other through forwarding by another device. This is not specifically limited in this embodiment of this application.

Before embodiments of this application are described, some terms in this application are first described, to help a person skilled in the art have a better understanding.

(1) Control resource set (CORESET): One CORESET includes a plurality of resource blocks (RB) in frequency domain and orthogonal frequency division multiplexing (OFDM) symbols in time domain, where one RB corresponds to 12 resource elements (RE). There are a plurality of candidate locations in a search space that may be for physical downlink control channel (PDCCH) transmission. The network device may configure one or more CORESETs for the terminal apparatus. Each CORESET is associated with one control channel element (CCE)-to-resource element group (REG) mapping. The CORESET currently supported spans 1, 2, or 3 contiguous OFDM symbols in time domain.

(2) Search space: An area in a downlink resource grid that may include a PDCCH, and a candidate location set in which a terminal apparatus needs to blindly detect the PDCCH. For example, if the terminal apparatus blindly detects, based on a given CCE aggregation level, a PDCCH sent by the network device, to receive downlink control information (DCI) carried on the PDCCH, the search space is a set including PDCCH candidate locations in a CCE set defined based on the given aggregation level.

(3) Carrier bandwidth part (CBW): The carrier bandwidth part is a segment of consecutive resources in frequency domain, and may also be referred to as a bandwidth part (BWP or BP), a subband bandwidth, a narrowband, or a narrowband bandwidth, or may have another name. The name of the bandwidth part is not limited in embodiments of this application. In embodiments of this application, the name "BWP" is used as an example.

In addition, it should be understood that terms "system" and "network" in embodiments of this application may be used interchangeably. "At least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. Singular expressions "one", "a", "the", "the foregoing", "this", and "the one" are also intended to include expressions such as "one or more", unless otherwise specified in the context clearly. In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first bandwidth and a second bandwidth are merely used to distinguish between different thresholds, and do not indicate different priorities, different importance, or the like of the two bandwidths.

Reference to "an embodiment", "some embodiments", or the like described in embodiments of this application means that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The technical solutions provided in embodiments of this application are described below in detail with reference to the accompanying drawings.

In some embodiments, based on FIG. 1, the network device 101 may be configured to send first indication information to the first terminal apparatus 102. The first terminal apparatus 102 is configured to receive the first indication information from the network device 101. The first terminal apparatus 102 is further configured to determine a first bandwidth of a first bandwidth part BWP based on the first indication information, where the first BWP is for receiving first multicast information, and the first bandwidth is a bandwidth configured in a master information block MIB or a system information block SIB1. The first terminal apparatus 102 is further configured to receive the first multicast information on the first bandwidth. The first BWP is for multicast information reception. Optionally, the first BWP may be an initial downlink BWP configured in the SIB1, or may be an initial BWP configured in the MIB, or may be a BWP that is configured by a network side for the first terminal apparatus and that is for multicast information reception.

In the communication system provided in embodiments of this application, after receiving the first indication information, the first terminal apparatus 102 may determine the first bandwidth of the first BWP based on the first indication information. Based on the communication system provided in embodiments of this application, because the first terminal apparatus 102 may determine the first bandwidth of the first BWP based on the first indication information, the first terminal apparatus may receive the first multicast information by using the bandwidth that is configured in the SIB1 by the network device or the bandwidth that is configured in the MIB by the network device. This solution is applicable to a scenario in which the first terminal apparatus is in a non-connected state (for example, an idle state or an inactive state). A specific state of the non-connected state of the first terminal apparatus is not limited in this application. Based on this solution, bandwidth parameters can be flexibly configured for the first terminal apparatus 102 in the non-connected state for multicast information reception, to satisfy requirements for multicast service transmission.

In some other embodiments, the network device 101 may be configured to send second indication information to the first terminal apparatus 102. The second indication information indicates the first terminal apparatus 102 to use a first bandwidth or a second bandwidth after the first terminal apparatus 102 enters a connected state, where the first bandwidth is a bandwidth of an initial BWP configured in the SIB1, and the second bandwidth is a bandwidth configured to receive multicast information and may be configured in the SIB1. The first terminal apparatus 102 is configured to receive the second indication information from the network device 101. The first terminal apparatus 102 is further configured to determine, based on the second indication information, that the bandwidth of the initial BWP is the first bandwidth or the second bandwidth.

In the communication system provided in embodiments of this application, after receiving the second indication information, the first terminal apparatus 102 may determine the bandwidth of the initial BWP based on the second indication information. Based on the communication system provided in embodiments of this application, the first terminal apparatus 102 may determine the bandwidth of the initial BWP based on the second indication information, so that after entering the connected state, when receiving the multicast information, the first terminal apparatus 102 may receive the multicast information on the second bandwidth configured to receive the multicast information. The second bandwidth may be configured in the SIB1, other system information, or a multicast logical channel. The second bandwidth is a bandwidth for multicast information reception, or a bandwidth used when the first terminal apparatus receives the multicast information. Therefore, after entering the connected state, the first terminal apparatus 102 may receive the multicast information by pertinently using a corresponding bandwidth. This can satisfy requirements for multicast service reception by the first terminal apparatus 102 and avoid a resource waste caused, by using the second bandwidth configured to receive the multicast information, by the first terminal apparatus that does not receive the multicast information.

The following specifically describes a multicast information receiving method provided in an embodiment of this application with reference to FIG. 1.

It should be understood that the method shown in this embodiment of this application may be applied to not only the communication system shown in FIG. 1 but also another future communication system, for example, a 6G communication system. In the future communication system, the first terminal apparatus and the network device may maintain same functions, but their names may change. In addition, the method may be performed by two communication apparatuses. The two communication apparatuses are, for example, a first communication apparatus and a second communication apparatus. The first communication apparatus may be a network device or another communication apparatus that can support the network device in implementing a function required in the method. Alternatively, the first communication apparatus may be a first terminal apparatus or another communication apparatus that can support the first terminal apparatus in implementing a function required in the method. Certainly, the first communication apparatus may alternatively be another communication apparatus, for example, a chip system. Similarly, the second communication apparatus may be a network device or another communication apparatus that can support the network device in implementing a function required in the method. Alternatively, the second communication apparatus may be a first terminal apparatus or a communication apparatus that can support the first terminal apparatus in implementing a function required in the method. Certainly, the second communication apparatus may alternatively be another communication apparatus, for example, a chip system. Implementations of the first communication apparatus and the second communication apparatus are not limited. For example, the first communication apparatus may be the network device, and the second communication apparatus may be the first terminal apparatus, or the first communication apparatus may be the first terminal apparatus, and the second communication apparatus may be the network device.

For ease of description, the following describes several embodiments of receiving multicast information by the first terminal apparatus provided in embodiments of this application by using an example in which the method is performed through interaction between the first terminal apparatus and the network device, that is, by using an example in which the first communication apparatus is the first terminal apparatus and the second communication apparatus is the network device.

Figure 2:
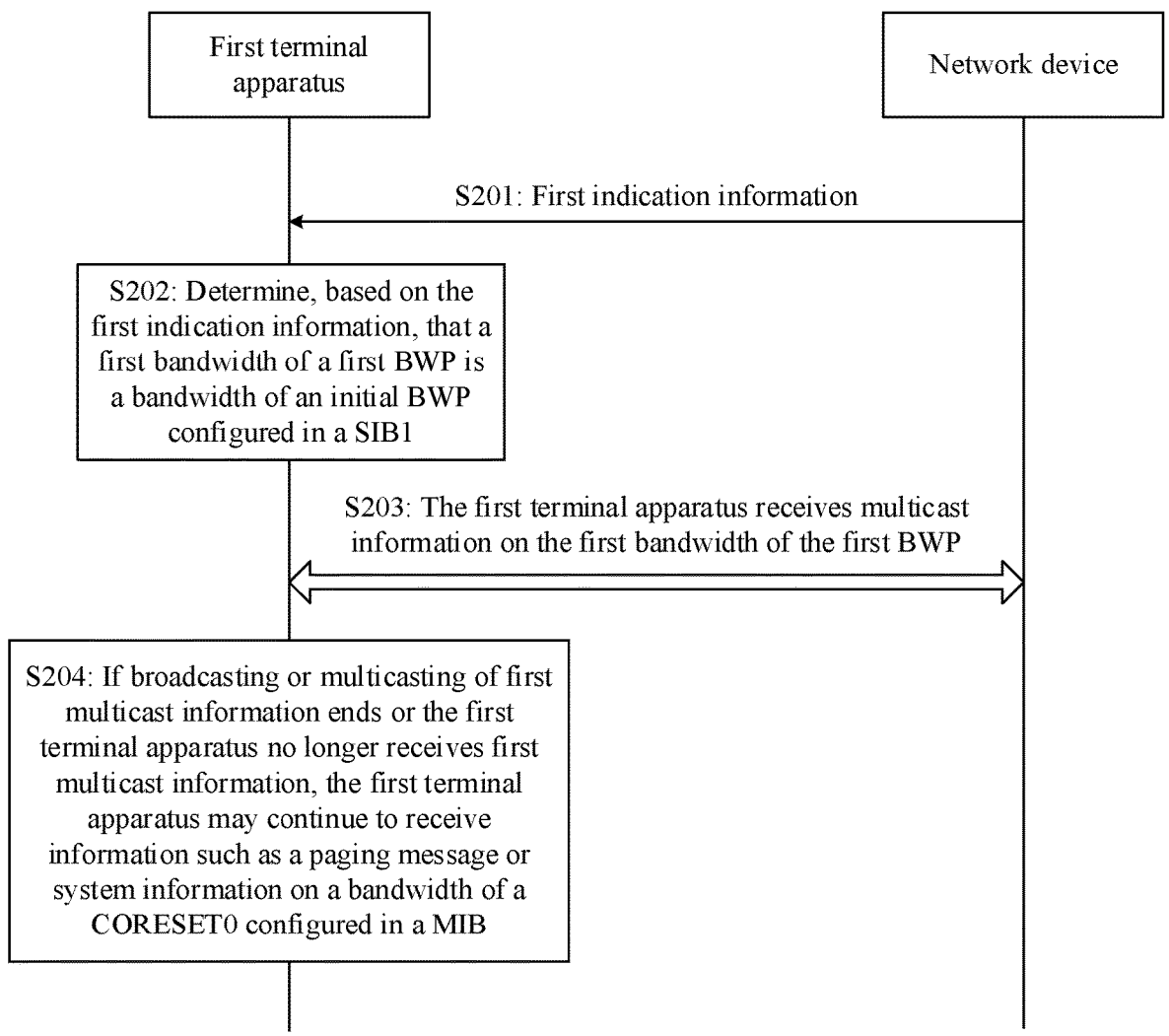
FIG. 2 is a schematic flowchart of a multicast information receiving method according to an embodiment of this application.

The communication system shown in FIG. 1 is used as an example. FIG. 2 is a schematic flowchart of a multicast information receiving method according to an embodiment of this application. A process of the method includes the following steps.

S201: A network device sends first indication information to a first terminal apparatus. Correspondingly, the first terminal apparatus receives the first indication information from the network device. The first indication information is for determining a first bandwidth of a first BWP, the first BWP is for receiving first multicast information, and the first bandwidth may be a bandwidth configured in a system information block SIB1.

For example, before the first terminal apparatus receives multicast information (which may also be referred to as a multicast service in this embodiment of this application), the network device may send the first indication information to the first terminal apparatus by using system information (SI), for example, the SIB1 or other system information, or a multicast logical channel (a logical channel for multicast data and/or signaling transmission). Specifically, the system information may include a MIB and a series of SIBs, for example, the SIB1. The MIB and SIB1 include basic information for initial access and for obtaining other system information. The MIB includes necessary information for obtaining the system information, such as configuration information related to a CORESET0 and search space zero. The SIB1 includes information such as scheduling information of another system information block, a bandwidth of an initial BWP that can be used by a terminal apparatus after the terminal apparatus enters a connected state, and a configuration required for initial access.

Specifically, an initial BWP is configured in the MIB, and may be used by a terminal apparatus in a non-connected state for service information reception, for example, used to receive information such as a SIB1 and paging information. A bandwidth of the initial BWP is equal to a bandwidth of the CORESET0. The bandwidth of the initial BWP may be further extended in the SIB1. To be specific, a bandwidth of an initial downlink BWP configured in the SIB1 may be greater than or equal to the bandwidth of the CORESET0, and the initial downlink BWP covers the CORESET0 in frequency domain. The bandwidth of the initial downlink BWP (which may also be referred to as the initial BWP in this application) configured in the SIB1 may be used by the terminal apparatus in the non-connected state for service information reception after the terminal apparatus enters the connected state.

In the current technology, the bandwidth of the initial BWP configured in the SIB1 can be used only by the terminal apparatus in the connected state, and the terminal apparatus in the non-connected state cannot receive service information by using the bandwidth configured in the SIB1. The service information includes multicast information. However, according to the 3rd Generation Partnership Project (3GPP) Rel 15 protocol, a maximum bandwidth of the initial BWP configured in the MIB is 20 MHz, that is, the bandwidth of the initial BWP in the MIB has a limitation on multicast information reception. To resolve this problem, in this embodiment of this application, the network device includes the first indication information in the SIB1 or the other system information or the multicast logical channel, to indicate that the first terminal apparatus can receive the multicast information by using the first bandwidth of the first BWP, for example, indicate the first terminal apparatus to receive the multicast information on the bandwidth of the initial BWP configured in the SIB1, so that the bandwidth for multicast information reception by the first terminal apparatus can be increased. For example, the bandwidth for multicast information reception by the first terminal apparatus in the non-connected state may be increased. This can further satisfy requirements for multicast service transmission.

S202: The first terminal apparatus determines, based on the first indication information, that the first bandwidth of the first BWP is the bandwidth of the initial BWP configured in the SIB1.

In an example, the bandwidth of the initial BWP configured in the SIB1 is a bandwidth extended based on the bandwidth of the CORESET0. The first terminal apparatus may determine, based on the received first indication information, that the first bandwidth of the first BWP is the bandwidth of the initial BWP configured in the SIB1.

In this embodiment of this application, the first terminal apparatus may determine, based on the first indication information, that the first bandwidth of the first BWP is the bandwidth of the initial BWP configured in the SIB1. In other words, the first terminal apparatus may receive the multicast information by using the bandwidth of the initial BWP configured in the SIB1, so that the bandwidth for multicast information reception by the first terminal apparatus can be increased. Therefore, the first indication information may indicate the first terminal apparatus in the non-connected state (for example, an idle state or an inactive state) to receive the multicast information by using the bandwidth configured in the SIB1 as a bandwidth parameter of the BWP, so that the first terminal apparatus may use a high bandwidth configured in the SIB1 when the first terminal apparatus does not enter the connected state, to satisfy requirements for multicast service transmission.

In a specific implementation process, the network device may configure, based on multicast information that is being broadcast in a cell, an attribute parameter of a cell, a configuration parameter, a capacity parameter, a capability of the terminal apparatus, or the like, the first bandwidth of the first BWP for multicast information reception, but this is not limited. For example, the network device may configure an appropriate first bandwidth of the first BWP for the cell based on bandwidth resources required by multicast information that may be broadcast or is being broadcast in the cell. The first bandwidth of the first BWP is used by a terminal apparatus that is receiving or is interested in the multicast information in the cell for multicast information reception. Specifically, the multicast information that may be broadcast by the network device may be multicast information that is not broadcast by the network device to the cell but exists or needs to be broadcast in the future. For example, because no terminal apparatus in the cell receives multicast information, after the network device currently does not broadcast the multicast information to the cell, if the network device determines that a terminal apparatus in the cell intends to receive the broadcast information, and the network device broadcasts the multicast information to the cell, the multicast information may alternatively be the multicast information that is being broadcast by the network device to the cell.

In an example, the first bandwidth of the first BWP for multicast information reception may be determined by the network device based on information such as a location and bandwidth IE (for example, a location and bandwidth IE) of the BWP or a field configured in the SIB1.

In this embodiment of this application, the network device may configure, for different cells, the first bandwidth of the first BWP for multicast information reception, to save resources.

In a specific implementation process, the first indication information may indicate the first bandwidth of the first BWP in different manners. For example, the indication manners may include but are not limited to the following several manners:

Manner 1: The first indication information may indicate the first bandwidth of the first BWP in an explicit manner. In other words, the first indication information is explicit indication information, and may exist in but is not limited to the SIB1 or the other system information or the multicast logical channel. In an example, the first indication information indicates whether the first terminal apparatus can use the bandwidth of the initial BWP configured in the SIB1. For example, the first indication information may be a new IE or field. In other words, the first terminal apparatus may determine, depending on whether the SIB1 includes the IE or the field, whether the first terminal apparatus can receive the multicast information by using the bandwidth of the initial BWP configured in the SIB1. For example, the first terminal apparatus determines that the SIB1 includes a new IE or a new field, so that the first terminal apparatus determines that the bandwidth of the initial BWP configured in the SIB1 can be for multicast information reception. For example, an attribute of the new IE or field may be an enumerated type, for example, {true/false} is enumerated, or {supported/not supported} is enumerated, or enumeration may not be used.

Manner 2: The first indication information may indicate the first bandwidth of the first BWP in an explicit manner. In other words, the first indication information is explicit indication information. In an example, the first indication information may be an identifier of any multicast information for indicating the multicast information. After receiving the identifier, the first terminal apparatus may determine that the first terminal apparatus receives the multicast information, and receives the multicast information by using the bandwidth of the initial BWP configured in the SIB1. Alternatively, the first indication information may be radio bearer information corresponding to the multicast information. After receiving the radio bearer information, the first terminal apparatus may determine that service information that the first terminal apparatus is interested in or is receiving is the multicast information, and receive the service information by using the bandwidth of the initial BWP configured in the SIB1. A specific form of the first indication information is not limited herein.

Manner 3: The first indication information may indicate the first bandwidth of the first BWP in an implicit manner. In other words, the first indication information is implicit indication information. In an example, the first indication information may be a first CORESET in the SIB1 or a search space corresponding to the first CORESET. For example, the first indication information is the first CORESET in the SIB1. The first terminal apparatus receives the first CORESET in the SIB1, and the first CORESET corresponds to the initial BWP. If a bandwidth of the first CORESET is greater than or equal to the bandwidth of the CORESET0 configured in the MIB, it indicates that BWP resources used by the first terminal apparatus to receive the multicast information are configured in the SIB1. The first terminal apparatus may determine that the first bandwidth of the first BWP for multicast information reception is the bandwidth of the initial BWP configured in the SIB1. In an example, the first indication information may be one or any combination of a character, a field, or an information element in configuration information of the first CORESET. This is not specifically limited in this embodiment of this application. For example, the first indication information is the bandwidth of the first CORESET. When determining, based on the bandwidth of the first CORESET, that the bandwidth of the first CORESET is greater than or equal to the bandwidth of the CORESET0, the first terminal apparatus may determine that the first bandwidth of the first BWP is the bandwidth of the initial BWP configured in the SIB1. Alternatively, when determining that the SIB1 includes the first CORESET, the first terminal apparatus may determine that the first bandwidth of the first BWP is the bandwidth of the initial BWP configured in the SIB1.

In a specific implementation process, the network device may configure the first CORESET in a plurality of manners. For example, the network device may configure, based on the CORESET0 configured in the MIB, a first CORESET whose bandwidth is the same as the bandwidth of the CORESET0 and whose frequency domain is the same as a frequency domain of the CORESET0. This may be understood as that the first CORESET overlaps the CORESET0. Alternatively, the network device configures, through extension based on the CORESET0 configured in the MIB, a first CORESET whose bandwidth is greater than the bandwidth of the CORESET0. The network device may further configure the search space corresponding to the first CORESET.

It should be noted that the network device may configure, in the SIB1, the other system information, or the multicast logical channel, a CORESET corresponding to the first bandwidth of the first BWP. Specifically, the CORESET corresponding to the first bandwidth of the first BWP may be configured by the network device in the following several manners. For example, the configuration manners may include but are not limited to the following several manners:

Example 1: The network device still uses the CORESET0 configured in the MIB as the CORESET corresponding to the first bandwidth of the first BWP. In other words, the CORESET corresponding to the first bandwidth of the first BWP is the CORESET0. In Example 1, the first terminal apparatus may listen to multicast control information on the bandwidth of the CORESET0, and receive multicast service information on the first bandwidth of the first BWP. Optionally, the multicast service information may be a multicast data packet or multicast data information.

Example 2: The network device configures a new CORESET, that is, the first CORESET, for the first bandwidth of the first BWP. The first CORESET is extended based on the CORESET0. To be specific, the first CORESET covers the CORESET0, and a bandwidth of the first CORESET is greater than the bandwidth of the CORESET0 and is less than or equal to the first bandwidth of the first BWP. The network device may further configure a corresponding search space for the first CORESET. In Example 2, the first terminal apparatus may listen to multicast control information on the bandwidth of the first CORESET, and receive multicast service information on the first bandwidth of the first BWP.

Example 3: The network device configures a new CORESET, that is, the first CORESET, for the first bandwidth of the first BWP. A bandwidth of the first CORESET is equal to the bandwidth of the CORESET0, and the network device may further configure a corresponding search space for the first CORESET. In Example 3, the first terminal apparatus may listen to multicast control information on the bandwidth of the first CORESET, and receive multicast service information on the first bandwidth of the first BWP.

In Examples 2 and 3, because the first CORESET covers the CORESET0, receiving of paging information, receiving of system information, or the like by the first terminal apparatus is not affected.

S203: The first terminal apparatus receives the first multicast information on the first bandwidth of the first BWP.

In an example, if the first terminal apparatus determines, based on the first indication information, that the first bandwidth of the first BWP is the bandwidth of the initial BWP configured in the SIB1, the first terminal apparatus may receive the first multicast information on the bandwidth of the initial BWP configured in the SIB1.

In an implementation scenario of this embodiment of this application, the multicast information receiving method may further include the following step S204.

S204: If broadcasting or multicasting of the first multicast information ends or the first terminal apparatus no longer receives the first multicast information, the first terminal apparatus may continue to receive information such as a paging message or system information on the bandwidth of the CORESET0 configured in the MIB, to save resources.

In this embodiment of this application, after receiving the first indication information, the first terminal apparatus may determine, based on the first indication information, that the first bandwidth of the first BWP is the bandwidth of the initial BWP configured in the SIB1, so that the first terminal apparatus may receive the first multicast information on the bandwidth of the initial BWP configured in the SIB1. This solution is applicable to a scenario in which the first terminal apparatus is in the non-connected state. A specific state of the non-connected state of the first terminal apparatus is not limited in this application. Based on the foregoing solution, a bandwidth used to receive the first multicast information by the first terminal apparatus in the non-connected state can be increased, and requirements for first multicast information transmission can be further satisfied.

Figure 3:
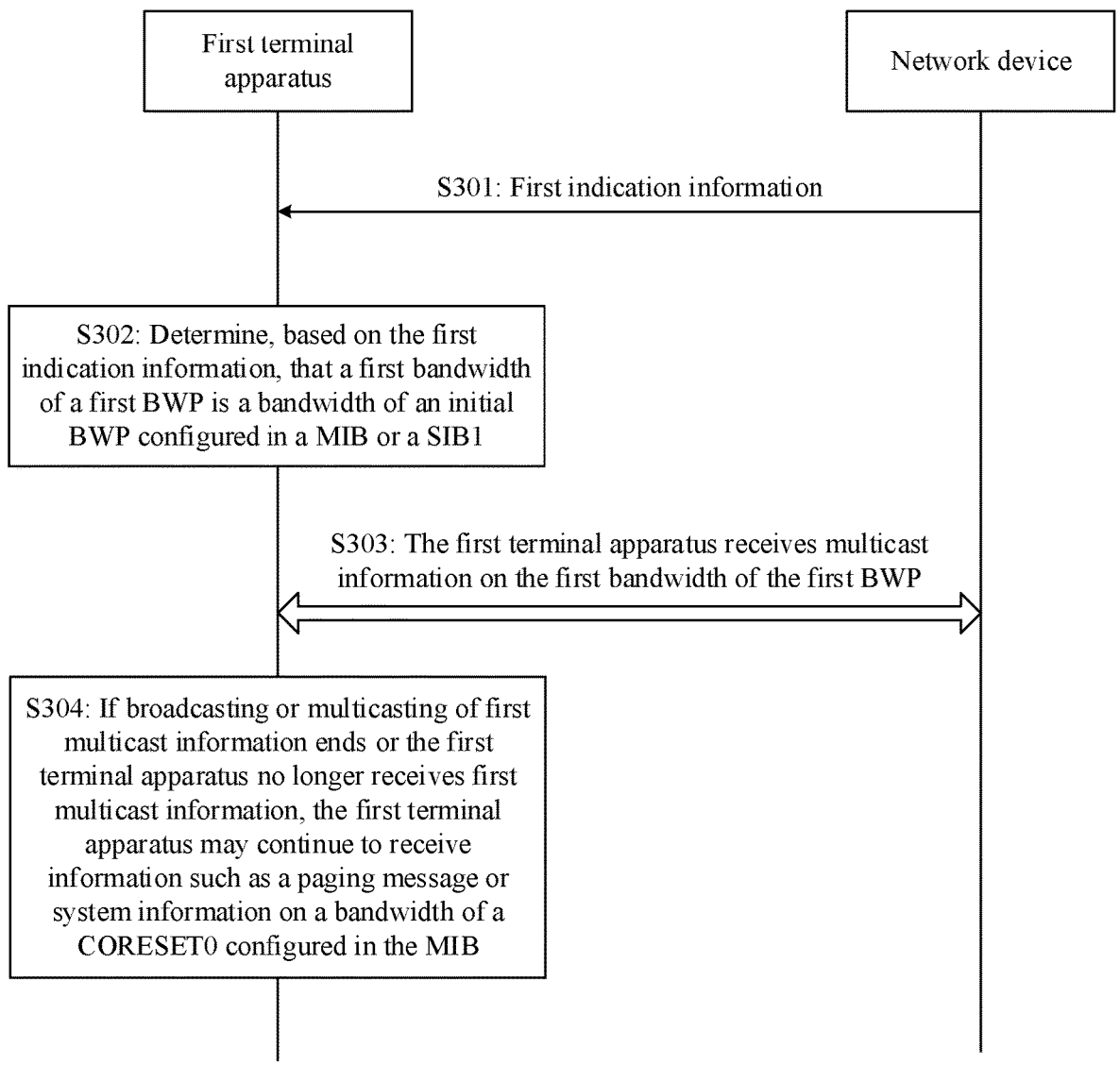
FIG. 3 is a schematic flowchart of a multicast information receiving method according to an embodiment of this application.

The communication system shown in FIG. 1 is used as an example. FIG. 3 is a schematic flowchart of a multicast information receiving method according to an embodiment of this application. A process of the method includes the following steps.

S301: A network device sends first indication information to a first terminal apparatus. Correspondingly, the first terminal apparatus receives the first indication information sent by the network device. The first indication information is for determining a first bandwidth of a first BWP, the first BWP is for receiving first multicast information, and the first bandwidth may be a bandwidth configured in a master information block MIB or a system information block SIB1.

Because a bandwidth of an initial BWP configured in the MIB is limited, a terminal apparatus in a non-connected state may receive some multicast information that requires a low bandwidth. However, there is a limitation in some scenarios in which a high bandwidth is required for multicast information reception. To resolve this problem, in this embodiment of this application, the network device indicates, by using the first indication information included in the SIB1, other system information, or a multicast logical channel, that the first terminal apparatus may receive multicast information by using the bandwidth of the initial BWP configured in the MIB or the SIB1, to improve resource utilization.

For example, before receiving the first multicast information, the first terminal apparatus may obtain a correspondence between multicast information and a receive bandwidth. In an example, the first indication information may be the correspondence between the multicast information and the receive bandwidth. The network device sends the correspondence to the first terminal apparatus. Correspondingly, the first terminal apparatus may determine, based on the received correspondence, to receive the first multicast information by using the bandwidth of the initial BWP configured in the SIB1 or the MIB.

In another example, the first indication information may be indication information indicating that the first terminal apparatus can use (or the first terminal apparatus is allowed to use) the bandwidth of the initial BWP configured in the SIB1 or the MIB to receive the multicast information. The first terminal apparatus may receive the first indication information before receiving the multicast information, or may receive the first indication information after receiving the multicast information, or may receive the first indication information in a process of receiving the multicast information. A sequence of receiving the multicast information and receiving the first indication information by the first terminal apparatus is not limited in this embodiment. The network device sends the first indication information to the first terminal apparatus, to indicate that the first terminal apparatus can or is allowed to receive the multicast information by using the bandwidth of the initial BWP configured in the SIB1 or the MIB. Correspondingly, the first terminal apparatus may determine, based on the received first indication information and the first multicast information that the first terminal apparatus is interested in or is receiving, and based on the correspondence between the multicast information and the receive bandwidth, to receive or continue to receive the first multicast information by using the bandwidth of the initial BWP configured in the SIB1 or the MIB. In this example, the correspondence between the multicast information and the receive bandwidth may be preconfigured, or may be sent by the network device to the first terminal apparatus. This is not limited in this embodiment of this application.

S302: The first terminal apparatus determines, based on the first indication information, that the first bandwidth of the first BWP is the bandwidth of the initial BWP configured in the MIB or the SIB1.

In an example, the network device may determine, based on a receive bandwidth required by the multicast information, to send the multicast information on a corresponding bandwidth, for example, send the multicast information on a bandwidth of the SIB1, or the other system information, or the multicast logical channel, or a bandwidth configured in the MIB, to form a correspondence between the multicast information and the receive bandwidth. For example, the network device sends the multicast information on the bandwidth configured in the SIB1 or the MIB. If the network device determines, based on a receive bandwidth required by a piece of multicast information, to send the multicast information on the bandwidth configured in the SIB1, a correspondence between the multicast information and the bandwidth configured in the SIB1 may be formed. Alternatively, if the network device determines, based on a receive bandwidth required by a piece of multicast information, to send the multicast information on the bandwidth configured in the MIB, a correspondence between the multicast information and the bandwidth configured in the MIB may be formed. Specifically, the correspondence may be a correspondence between intra-cell multicast information and the receive bandwidth, or may be a correspondence between multicast information in a plurality of cells (that is, a cell group) and the receive bandwidth, or may be a correspondence between multicast information in an area and the receive bandwidth. A scope to which the correspondence is applicable is not limited in this application. In a specific implementation process, the correspondence between the multicast information and the receive bandwidth may alternatively be a correspondence between a type of the multicast information and the receive bandwidth. For example, if the network device determines, based on a receive bandwidth required by some types of multicast information, to send the multicast information on the bandwidth configured in the SIB1, a correspondence between these types of multicast information and the bandwidth configured in the SIB1 may be formed. Alternatively, if the network device determines, based on a receive bandwidth required by some types of multicast information, to send the multicast information on the bandwidth configured in the MIB, a correspondence between these types of multicast information and the bandwidth configured in the MIB may be formed.

In an example, the network device may send the correspondence between the multicast information and the receive bandwidth to the first terminal apparatus as the first indication information, to indicate that the first terminal apparatus can or is allowed to receive the multicast information by using the bandwidth of the initial BWP configured in the SIB1 or the MIB. Correspondingly, the first terminal apparatus may determine, based on the correspondence and the first multicast information that the first terminal apparatus is interested in or is receiving, that the first bandwidth used to receive the first multicast information is the bandwidth of the initial BWP configured in the SIB1 or the MIB. Alternatively, the network device may separately send the first indication information and the correspondence to the first terminal apparatus, where the first indication information indicates that the first terminal apparatus can or is allowed to receive the multicast information by using the bandwidth of the initial BWP configured in the SIB1 or the MIB. Correspondingly, the first terminal apparatus may determine, based on the received correspondence and indication content of the first indication information, that the first bandwidth used to receive first multicast information is the bandwidth of the initial BWP configured in the SIB1 or the MIB.

For example, Table 1 shows a correspondence between multicast information and a receive bandwidth according to this embodiment of this application.

TABLE 1

| Multicast information | Receive bandwidth |
| --- | --- |
| Multicast information a | Bandwidth of an initial BWP configured in a MIB |
| Multicast information b | Bandwidth of an initial BWP configured in a SIB1 |
| Multicast information c | Bandwidth of the initial BWP configured in the SIB1 |
| Multicast information d | Bandwidth of the initial BWP configured in the MIB |

For example, as shown in Table 1, after receiving the first indication information, the first terminal apparatus may determine, based on the first multicast information that the first terminal apparatus is interested in or is receiving and the correspondence, that the first bandwidth is the bandwidth of the initial BWP configured in the MIB or the SIB1. For example, when the first terminal apparatus receives a piece of multicast information, if the first multicast information that the first terminal apparatus is interested in or is receiving is the multicast information a or the multicast information d, the first terminal apparatus may determine, based on the received first indication information and Table 1, that the first bandwidth of the first BWP is the bandwidth of the initial BWP configured in the MIB. Alternatively, if the first multicast information that the first terminal apparatus is interested in or is receiving is the multicast information b or the multicast information c, the first terminal apparatus may determine, based on the received first indication information and Table 1, that the first bandwidth of the first BWP is the bandwidth of the initial BWP configured in the SIB1. When the first terminal apparatus receives a plurality of pieces of multicast information, the first terminal apparatus may determine, based on the foregoing correspondence, to receive the plurality of pieces of multicast information by using the bandwidth of the initial BWP configured in the MIB or the SIB1. For example, if the plurality of pieces of multicast information include the multicast information a and the multicast information d, the first terminal apparatus may determine, based on Table 1, to receive the multicast information a and the multicast information d by using the bandwidth of the initial BWP configured in the MIB. Alternatively, the network device may send a correspondence between a multicast information group and the receive bandwidth to the first terminal apparatus, so that the first terminal apparatus may receive service information by using the bandwidth of the initial BWP configured in the MIB or the SIB1. The first terminal apparatus may determine, based on the received correspondence between the multicast information group and the receive bandwidth, to receive the plurality of pieces of multicast information by using the bandwidth of the initial BWP configured in the MIB or the SIB1.

In an example, the first indication information is the correspondence between the multicast information and the receive bandwidth. The first terminal apparatus may determine, based on an identifier of the multicast information and an identifier of the receive bandwidth in the correspondence, that the first bandwidth of the first BWP is the bandwidth of the initial BWP configured in the MIB or the SIB1. For example, in the correspondence, the multicast information may be indicated by the ID of the multicast information or a radio network temporary identifier (RNTI) for scrambling multicast service control information, for example, a group radio network temporary identifier (G-RNTI), a temporary mobile group identity (TMGI), or another identifier. The bandwidth of the initial BWP for multicast information reception may be indicated by a 1-bit or 2-bit bitmap, an enumeration method, or the like. For example, if the bandwidth of the initial BWP for multicast information reception is indicated by the 1-bit bitmap, 0 may represent the bandwidth of the initial BWP configured in the MIB, and 1 may represent the bandwidth of the initial BWP configured in the SIB1. Alternatively, if the bandwidth of the initial BWP for multicast information reception is indicated by the 2-bit bitmap, the first bit may indicate whether to use the bandwidth of the initial BWP configured in the MIB, the second bit may indicate whether to use the bandwidth of the initial BWP configured in the SIB1, and so on. Alternatively, if the bandwidth of the initial BWP for multicast information reception is indicated by using the enumeration method such as enumerating {true/false} or enumerating {supported/not supported}, when an attribute of the bandwidth of the initial BWP for multicast information reception is true or supported, the bandwidth of the initial BWP for multicast information reception may be represented as the bandwidth of the initial BWP configured in the SIB1, or when an attribute of the bandwidth of the initial BWP for multicast information reception is false or not supported, the bandwidth of the initial BWP for multicast information reception may be represented as the bandwidth of the initial BWP configured in the MIB. The first terminal apparatus may determine, based on the identifier of the multicast information, the first multicast information that the first terminal apparatus is interested in, and determine, based on the identifier of the receive bandwidth, that the bandwidth for first multicast information reception is the bandwidth of the initial BWP configured in the MIB or the SIB1.

In another example, the first indication information is indication information indicating the first terminal apparatus to use the bandwidth of the initial BWP configured in the SIB1 or the MIB. Before sending the first indication information to the first terminal apparatus, the network device may send the correspondence between the multicast information and the receive bandwidth to the first terminal apparatus in advance by using the SIB1 or the other system information or the multicast logical channel. Alternatively, the first terminal apparatus may obtain a preconfigured correspondence between the multicast information and the receive bandwidth. The first terminal apparatus may determine, based on the received first indication information and the first multicast information that the first terminal apparatus is interested in or is receiving and based on the correspondence, that the first bandwidth used to receive the first multicast information is the bandwidth of the initial BWP configured in the MIB or the SIB1. In this example, the first indication information may indicate the first bandwidth of the first BWP in different manners. For example, the manners may include but are not limited to the following several manners:

Manner 1: The first indication information may indicate the first bandwidth of the first BWP in an explicit manner. In other words, the first indication information is explicit indication information, and may exist in but is not limited to the SIB1 or the other system information or the multicast logical channel. Optionally, the first indication information indicates the first terminal apparatus to use the bandwidth of the initial BWP configured in the SIB1, or use the bandwidth of the initial BWP configured in the MIB. For example, the first indication information may be a new IE or field. In other words, the first terminal apparatus may determine, based on that the SIB1, other system information, or the multicast logical channel includes the IE or the field, that the first terminal apparatus uses the bandwidth of the initial BWP configured in the SIB1 to receive the multicast information, or uses the bandwidth of the initial BWP configured in the MIB to receive the multicast information. For example, an attribute of the new IE or field may be an enumerated type, for example, {true/false} is enumerated, or {supported/not supported} is enumerated, or enumeration may not be used. When the first terminal apparatus determines, based on the new IE or field in the SIB1, the other system information, or the multicast logical channel, that the bandwidth of the initial BWP configured in the SIB1 can be for multicast information reception, the first terminal apparatus determines that the first bandwidth of the first BWP for multicast information reception is the bandwidth of the initial BWP configured in the SIB1. Alternatively, when the first terminal apparatus determines, based on the new IE or field in the SIB1, the other system information, or the multicast logical channel, that the bandwidth of the initial BWP configured in the SIB1 cannot be for multicast information reception, the first terminal apparatus determines that the first bandwidth of the first BWP for multicast information reception is the bandwidth of the initial BWP configured in the MIB.

Manner 2: The first indication information may indicate the first bandwidth of the first BWP in an explicit manner. In other words, the first indication information is explicit indication information. Optionally, the first indication information is an identifier of any multicast information for indicating the multicast information. After receiving the identifier, the first terminal apparatus may determine that the first terminal apparatus receives the multicast information, and receive the multicast information by using the bandwidth of the initial BWP configured in the SIB1 or by using the bandwidth of the initial BWP configured in the MIB. Alternatively, the first indication information may be radio bearer information corresponding to the multicast information. After receiving the radio bearer information, the first terminal apparatus may determine that service information that the first terminal apparatus is interested in or is receiving is the multicast information, and receive the service information by using the bandwidth of the initial BWP configured in the MIB or the SIB1. A specific form of the first indication information is not limited herein.

Manner 3: The first indication information may indicate the first bandwidth of the first BWP in an implicit manner. In other words, the first indication information is implicit indication information. Optionally, the first indication information may be a first CORESET configured in the SIB1 or a search space corresponding to the first CORESET. For example, the first indication information is the first CORESET configured in the SIB1. The first terminal apparatus receives the first CORESET in the SIB1. If a bandwidth of the first CORESET is greater than a bandwidth of a CORESET0 configured in the MIB, it indicates that BWP resources used by the first terminal apparatus to receive the multicast information are configured in the SIB1. The first terminal apparatus may determine that the first bandwidth of the first BWP for multicast information reception is the bandwidth of the initial BWP configured in the SIB1. Alternatively, if a bandwidth of the first CORESET is less than or equal to a bandwidth of a CORESET0 configured in the MIB, it indicates that BWP resources used by the first terminal apparatus to receive the multicast information are not configured in the SIB1. The first terminal apparatus may determine that the first bandwidth of the first BWP for multicast information reception is the bandwidth of the initial BWP configured in the MIB. The first indication information may be one or any combination of a character, a field, or an information element in configuration information of the first CORESET. This is not specifically limited in this embodiment of this application. For example, the first indication information is the bandwidth of the first CORESET. When determining, based on the bandwidth of the first CORESET, that the bandwidth of the first CORESET is greater than the bandwidth of the CORESET0, the first terminal apparatus may determine that the first bandwidth of the first BWP is the bandwidth of the initial BWP configured in the SIB1. Alternatively, when determining, based on the bandwidth of the first CORESET, that the bandwidth of the first CORESET is less than or equal to the bandwidth of the CORESET0, the first terminal apparatus may determine that the first bandwidth of the first BWP is the bandwidth of the initial BWP configured in the MIB. Optionally, the bandwidth of the CORESET0 is 20 MHz.

It should be noted that the first CORESET is a CORESET that is configured by the network device and that is in the SIB1, the other system information, or the multicast logical channel. For a specific manner of configuring the first CORESET by the network device, refer to the related descriptions of configuring the first CORESET by the network device in S202 in FIG. 2. Details are not described herein again.

It should be noted that a manner of configuring the CORESET corresponding to the first bandwidth of the first BWP by the network device is applicable to all the foregoing examples. To be specific, in an example in which the first indication information is the correspondence between the multicast information and the receive bandwidth and the example in which the first indication information is the indication information indicating the first terminal apparatus to use the bandwidth of the initial BWP configured in the MIB or the SIB1, manners in which the network device configures the CORESET corresponding to the first bandwidth of the first BWP are the same or similar. Specifically, for the manner of configuring the CORESET corresponding to the first bandwidth of the first BWP by the network device, refer to the related descriptions of configuring the CORESET corresponding to the first bandwidth of the first BWP by the network device in S202 in FIG. 2. Details are not described herein again.

In this embodiment of this application, the network device configures the first bandwidth of the first BWP for the first terminal apparatus based on different multicast information. The first bandwidth of the first BWP is used by the first terminal apparatus to receive one or more pieces of multicast information. This can improve resource utilization and avoid a resource waste. Correspondingly, the first terminal apparatus may determine the first bandwidth of the first BWP based on the multicast information that the first terminal apparatus is interested in or is receiving and the first indication information. The first bandwidth of the first BWP is used by the first terminal apparatus to receive one or more pieces of multicast information. This can improve resource utilization and satisfy requirements for multicast service transmission.

S303: The first terminal apparatus receives the first multicast information on the first bandwidth of the first BWP.

In an example, if the first terminal apparatus determines, based on the first indication information, that the first bandwidth of the first BWP is the bandwidth of the initial BWP configured in the MIB, the first terminal apparatus may receive the first multicast information on the bandwidth of the initial BWP configured in the MIB. Alternatively, if the first terminal apparatus determines, based on the first indication information, that the bandwidth of the first BWP is the bandwidth of the initial BWP configured in the SIB1, the first terminal apparatus may receive the first multicast information on the bandwidth of the initial BWP configured in the SIB1.

In an implementation scenario of this embodiment of this application, the multicast information receiving method further includes the following step S304.

S304: In a case that broadcasting or multicasting of the first multicast information ends or the first terminal apparatus no longer receives the first multicast information, the first terminal apparatus may continue to receive information such as a paging message or system information on the bandwidth of the CORESET0 configured in the MIB, to save resources.

In this embodiment of this application, the first terminal apparatus may determine, based on different multicast information and the first indication information, that the first bandwidth of the first BWP is the bandwidth of the initial BWP configured in the MIB or the SIB1. In other words, the first terminal apparatus may determine, based on the first multicast information, to receive the first multicast information by using the bandwidth of the initial BWP configured in the MIB or the SIB1. Optionally, the first indication information may be the correspondence between the multicast information and the receive bandwidth, or may be the indication information indicating the first terminal apparatus to use the bandwidth of the initial BWP configured in the SIB1 or the MIB. Specific content of the first indication information is not limited in this application. This solution is applicable to a scenario in which the first terminal apparatus is in the non-connected state. A specific state of the non-connected state of the first terminal apparatus is not limited in this application. Based on the foregoing solution, resource utilization can be improved, and the resource waste can be further avoided while requirements for first multicast information transmission are satisfied.

Figure 4:
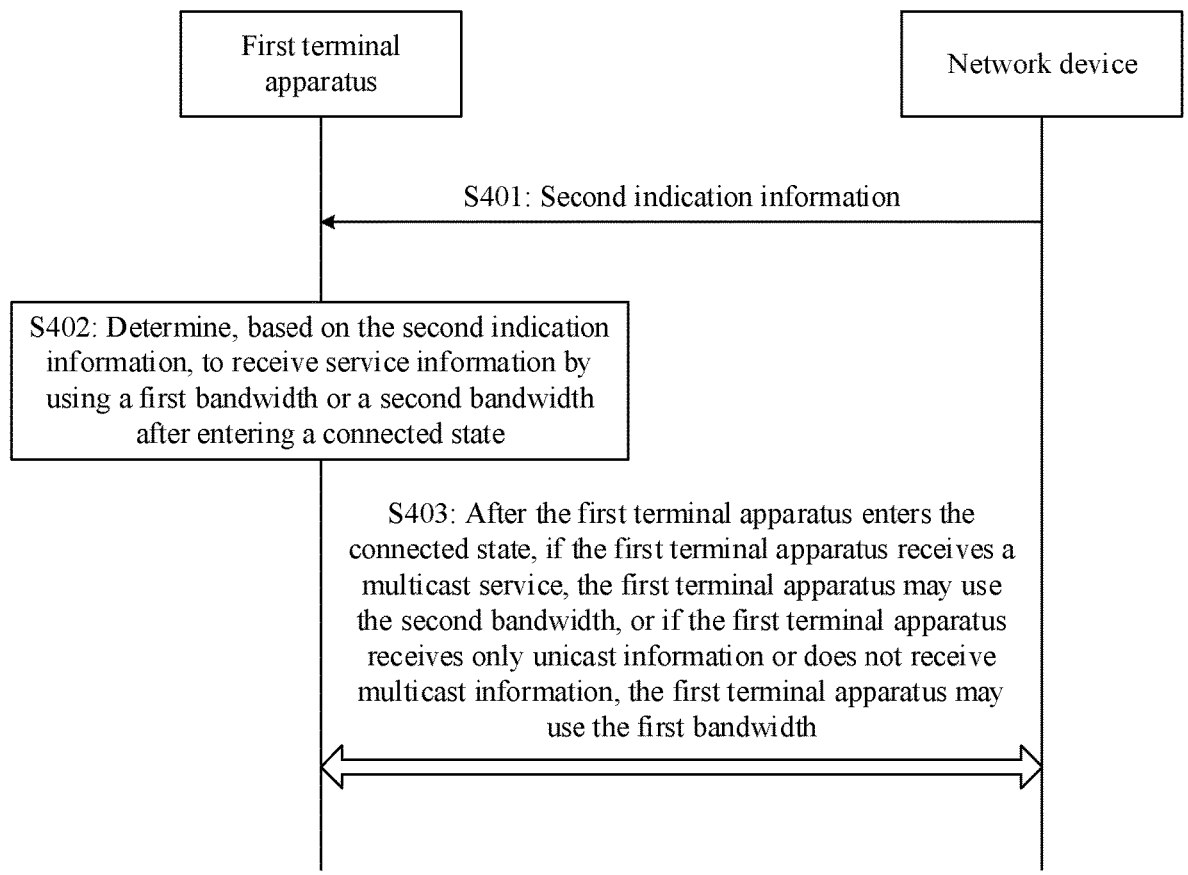
FIG. 4 is a schematic flowchart of an indication information sending/receiving method according to an embodiment of this application.

The communication system shown in FIG. 1 is used as an example. FIG. 4 is a schematic flowchart of an indication information sending/receiving method according to an embodiment of this application. A process of the method includes the following steps.

S401: A network device sends second indication information to a first terminal apparatus. Correspondingly, the first terminal apparatus receives the second indication information from the network device. The second indication information indicates the first terminal apparatus to receive service information by using a first bandwidth or a second bandwidth after the first terminal apparatus enters a connected state, where both the first bandwidth and the second bandwidth are configured in a SIB1. The first bandwidth is a bandwidth of an initial BWP, and the second bandwidth is a bandwidth for multicast information reception or a bandwidth used when the first terminal apparatus receives multicast information.

In this embodiment of this application, that the first terminal apparatus enters the connected state may include but is not limited to radio resource control (RRC) establishment, reestablishment, or resume. This is not specifically limited in this application.

For example, before the first terminal apparatus enters the connected state, the network device may send the second indication information to the first terminal apparatus by using the SIB1, other system information, or a multicast logical channel. To be specific, the first terminal apparatus receives the second indication information when the first terminal apparatus is in a non-connected state, and determines, based on the second indication information, whether to use the first bandwidth or the second bandwidth after the first terminal apparatus enters the connected state.

In this embodiment of this application, the network device may configure two bandwidths, namely, the first bandwidth and the second bandwidth, in the SIB1. Both the two bandwidths for service information reception may be used by the first terminal apparatus that enters the connected state from the non-connected state. Specifically, the first bandwidth of the two bandwidths is a bandwidth of the initial BWP and is used when the first terminal apparatus receives unicast information. The second bandwidth is a bandwidth for multicast information reception or a bandwidth used when the first terminal apparatus receives the multicast information. Optionally, both the first bandwidth and the second bandwidth are bandwidths corresponding to the initial BWP, or the first bandwidth and the second bandwidth correspond to two BWPs. To be specific, the first bandwidth is the bandwidth of the initial BWP, and the second bandwidth is a bandwidth of a BWP (which may also be referred to as a multicast BWP in this embodiment of this application) for multicast information reception, or an initial BWP (which may also be referred to as a multicast initial BWP in this embodiment of this application) for multicast information reception.

In an example, the network device may send the second indication information to the first terminal apparatus, to indicate the first terminal apparatus to determine to use the first bandwidth or the second bandwidth after the first terminal apparatus enters the connected state. For example, the second indication information may indicate the first terminal apparatus to receive the service information by using the first bandwidth or the second bandwidth after the first terminal apparatus enters the connected state. The first terminal apparatus may determine, based on first indication information sent by the network device, to use the first bandwidth or the second bandwidth after entering the connected state. Alternatively, the second indication information may indicate two bandwidths. The first bandwidth of the two bandwidths is the bandwidth of the initial BWP used when the first terminal apparatus receives unicast information, that is, the first terminal apparatus does not receive multicast information. The second bandwidth is a bandwidth for multicast information reception by a terminal apparatus such as the first terminal apparatus after the first terminal apparatus enters the connected state. After entering the connected state, the first terminal apparatus may choose to use a corresponding bandwidth based on the second indication information and depending on whether to receive the multicast information. In conclusion, the first terminal apparatus may determine, based on the second indication information sent by the network device, or based on the second indication information and depending on whether to receive the multicast information, to use the first bandwidth or the second bandwidth after entering the connected state.

S402: The first terminal apparatus determines, based on the second indication information, to use the first bandwidth or the second bandwidth after entering the connected state.

In an example, after entering the connected state, the first terminal apparatus determines, based on the second indication information sent by the network device, to receive the service information by using the first bandwidth or the second bandwidth. Alternatively, after entering the connected state, based on the second indication information sent by the network device, the first terminal apparatus uses the second bandwidth for receiving the multicast information, and uses the first bandwidth for receiving the unicast information. Optionally, the first bandwidth and the second bandwidth may be bandwidths of the initial BWP; or the first bandwidth is the bandwidth of the initial BWP, and the second bandwidth is a bandwidth of the multicast BWP or a bandwidth of the multicast initial BWP.

In a specific implementation process, the second indication information may indicate, in different manners, a bandwidth used after the first terminal apparatus enters the connected state. For example, the indication manners may include but are not limited to the following several manners:

Example 1: The second indication information may indicate the bandwidth of the initial BWP in an implicit manner. In other words, the second indication information is implicit indication information. In an example, after decoding the SIB1, when identifying that two bandwidths such as the first bandwidth and the second bandwidth that can be used by the first terminal apparatus after the first terminal apparatus enters the connected state are configured in the SIB1, the first terminal apparatus may determine, after entering the connected state, that a bandwidth for service information reception is the first bandwidth or the second bandwidth. The first bandwidth is a bandwidth used when the first terminal apparatus receives the unicast information, and the second bandwidth is a bandwidth for multicast information reception or a bandwidth used when the first terminal apparatus receives the multicast information. For example, if the first terminal apparatus does not receive the multicast information after entering the connected state, the first terminal apparatus determines to use the first bandwidth. If the first terminal apparatus receives the multicast information after entering the connected state, the first terminal apparatus determines to use the second bandwidth. Alternatively, after decoding the SIB1, when identifying that two BWPs such as the initial BWP and the multicast BWP that can be used by the first terminal apparatus after the first terminal apparatus enters the connected state are configured in the SIB1, the first terminal apparatus may determine, after entering the connected state, that a bandwidth for service information reception is the bandwidth of the initial BWP or the bandwidth of the multicast BWP. The bandwidth of the initial BWP is a bandwidth used when the first terminal apparatus receives the unicast information, that is, the first bandwidth, the bandwidth of the multicast BWP is a bandwidth for multicast information reception or a bandwidth, that is, the second bandwidth used when the first terminal apparatus receives the multicast information. For example, if the first terminal apparatus receives the multicast information after entering the connected state, the first terminal apparatus determines to use the bandwidth of the multicast BWP. If the first terminal apparatus receives the unicast information, the first terminal apparatus determines to use the bandwidth of the initial BWP.

Example 2: The second indication information may indicate, in an explicit manner, a bandwidth used after the first terminal apparatus enters the connected state. In other words, the second indication information is explicit indication information. For example, the second indication information may include but is not limited to msg4 signaling, radio resource control reestablishment (RRC reestablishment) signaling, radio resource control setup (RRC Setup) signaling, radio resource control resume (RRC Resume) signaling, a character or a field in other signaling, an RNTI such as a G-RNTI, or other indication information. This is not limited in this embodiment of this application. When receiving the second indication information before entering the connected state, the first terminal apparatus may determine, based on the second indication information, that the bandwidth for service information reception is the first bandwidth or the second bandwidth after the first terminal apparatus enters the connected state, where the first bandwidth is the bandwidth of the initial BWP, and the second bandwidth is the bandwidth of the multicast initial BWP or the bandwidth of the multicast BWP. For example, the second indication information is a new character or field in the foregoing signaling. In a specific process, if the first terminal apparatus determines that the foregoing signaling in the SIB1, the other system information, the multicast logical channel, or the like includes the new character or field, the first terminal apparatus may determine, after entering the connected state, that the bandwidth for service information reception is the first bandwidth or the second bandwidth. For example, an attribute of the new character or field may be an enumerated type, for example, {true/false} is enumerated, or {supported/not supported} is enumerated, or enumeration may not be used. For example, the attribute of the new character or field is that {true/false} is enumerated. If the first terminal apparatus determines that the attribute of the new character or field is true, the first terminal apparatus may determine to receive the service information by using the second bandwidth after entering the connected state; or if the first terminal apparatus determines that the attribute of the new character or field is false, the first terminal apparatus may determine to receive the service information by using the first bandwidth after entering the connected state.

In an example, the network device may configure a corresponding CORESET, that is, a second CORESET, for the second bandwidth. Specifically, the second CORESET may be configured in the SIB1, the other system information, or the multicast logical channel. In a specific implementation process, the network device may configure the second CORESET in a plurality of manners. For example, the manners may include but are not limited to the following manners.

Example 1: The network device may still use a CORESET0 configured in the MIB as the second CORESET. In other words, the second CORESET is the CORESET0. The network device may further configure a corresponding search space for the second CORESET. In Example 1, the first terminal apparatus may listen to multicast control information on a bandwidth of the CORESET0, and receive multicast service information on the second bandwidth.

Example 2: The network device may configure a new second CORESET. For example, the network device may configure, based on a CORESET0 configured in the MIB, a second CORESET whose bandwidth is the same as a bandwidth of the CORESET0 and whose frequency domain is the same as a frequency domain of the CORESET0. This may be understood as that the second CORESET overlaps the CORESET0. The network device may further configure a corresponding search space for the second CORESET. In Example 2, the first terminal apparatus may listen to multicast control information on the bandwidth of the second CORESET, and receive multicast service information on the second bandwidth.

Example 3: The network device configures, through extension based on a CORESET0 configured in the MIB, a second CORESET whose bandwidth is greater than a bandwidth of a CORESET0. To be specific, the second CORESET covers the CORESET0, and the bandwidth of the second CORESET is greater than the bandwidth of the CORESET0 and is less than or equal to the second bandwidth. The network device may further configure a corresponding search space for the second CORESET. In Example 3, the first terminal apparatus may listen to multicast control information on the bandwidth of the second CORESET, and receive multicast service information on the second bandwidth.

In Examples 2 and 3, because the second CORESET covers the CORESET0, receiving of paging information, system information, or the like by the first terminal apparatus in the connected state is not affected.

In this embodiment of this application, when receiving the multicast information after entering the connected state, the first terminal apparatus may determine, based on the second indication information, to use the second bandwidth; or when the first terminal apparatus receives only the unicast information, that is, does not receive the multicast information after entering the connected state, the first terminal apparatus may determine, based on the second indication information, to use the first bandwidth. This can improve resource utilization and better satisfy requirements for multicast information transmission.

S403: After the first terminal apparatus enters the connected state, if the first terminal apparatus receives the multicast service, the first terminal apparatus may use the second bandwidth, or if the first terminal apparatus receives only the unicast information, that is, does not receive the multicast information, the first terminal apparatus may use the first bandwidth.

In an example, when the multicast information that the first terminal apparatus is interested in is service information that has been received before the first terminal apparatus enters the connected state and that is still being received when the first terminal apparatus enters the connected state, the first terminal apparatus may determine to use the second bandwidth. Alternatively, when the multicast information that the first terminal apparatus is interested in is service information to be received by the first terminal apparatus after the first terminal apparatus enters the connected state, the first terminal apparatus may determine to use the second bandwidth.

Correspondingly, after the first terminal apparatus enters the connected state, if the first terminal apparatus does not receive the multicast information, the first bandwidth may be used. To be specific, after entering the connected state, the first terminal apparatus may determine, based on the second indication information, to use the first bandwidth or the second bandwidth, or the first terminal apparatus may determine, based on the first indication information and based on the received service information, to use the first bandwidth or the second bandwidth after entering the connected state.

In this embodiment of this application, when receiving the multicast information after entering the connected state, the first terminal apparatus may determine, based on the second indication information, to use the second bandwidth; or when the first terminal apparatus receives only the unicast information, that is, does not receive the multicast information after entering the connected state, the first terminal apparatus may determine, based on the second indication information, to use the first bandwidth. This can improve resource utilization, better satisfy requirements for multicast information transmission, and avoid a resource waste caused, by using the second bandwidth configured to receive the multicast information, by the first terminal apparatus that does not receive the multicast information.

Figure 5:
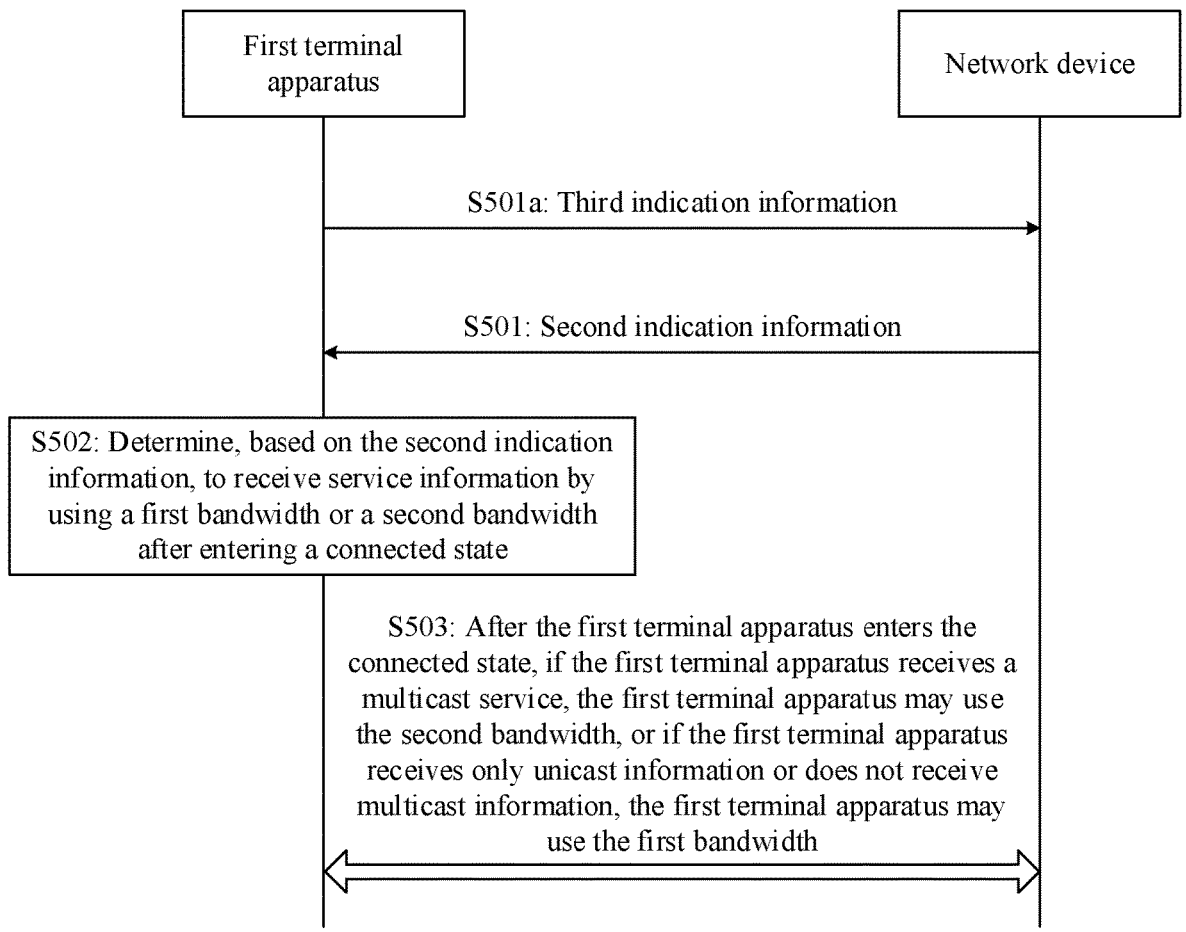
FIG. 5 is a schematic flowchart of an indication information sending/receiving method according to an embodiment of this application.

In some other embodiments, the communication system shown in FIG. 1 is used as an example to describe the embodiment shown in FIG. 4 in detail with reference to FIG. 5. FIG. 5 is a schematic flowchart of an indication information sending/receiving method according to an embodiment of this application. The method includes the following steps.

S501: A network device sends second indication information to a first terminal apparatus. Correspondingly, the first terminal apparatus receives the second indication information from the network device. The second indication information indicates the first terminal apparatus to receive service information by using a first bandwidth or a second bandwidth after the first terminal apparatus enters a connected state, where both the first bandwidth and the second bandwidth are configured in a SIB1. The first bandwidth is a bandwidth of an initial BWP, and the second bandwidth is a bandwidth for multicast information reception or a bandwidth used when the first terminal apparatus receives multicast information.

S502: The first terminal apparatus determines, based on the second indication information, to use the first bandwidth or the second bandwidth after entering the connected state.

Steps S501 and S502 are the same as steps S401 and S402 in the embodiment shown in FIG. 4. For related descriptions, refer to the embodiment shown in FIG. 4. Details are not described herein again.

Because the first bandwidth and the second bandwidth are configured in the SIB1, the network device may further pertinently send the second indication information to the first terminal apparatus depending on whether the first terminal apparatus receives the multicast information. To be specific, before step S501, the method may further include the following step:

S501a: The network device sends third indication information to the first terminal apparatus. Correspondingly, the network device receives the third indication information from the first terminal apparatus. The third indication information indicates whether the first terminal apparatus receives the multicast information. Optionally, the third indication information may indicate that the first terminal apparatus is receiving the multicast information or is interested in one or more pieces of multicast information, or the third indication information may indicate that the first terminal apparatus does not receive the multicast information or is not interested in one or more pieces of multicast information.

In an example, when the first terminal apparatus does not receive the multicast information and/or is not interested in the multicast information, the first terminal apparatus may send the third indication information to the network device, to indicate to the network device that the first terminal apparatus does not receive the multicast information and/or is not interested in the multicast information. Correspondingly, after receiving the third indication information, the network device may send the second indication information to the first terminal apparatus, where the second indication information indicates that a bandwidth for service information reception by the first terminal apparatus after the first terminal apparatus enters the connected state is the first bandwidth, or indicates that the first terminal apparatus uses the first bandwidth for unicast information reception after entering the connected state. Correspondingly, when receiving the second indication information, the first terminal apparatus may determine, based on the second indication information, that the bandwidth for service information reception is the first bandwidth after the first terminal apparatus enters the connected state, or determine to receive the unicast information by using the first bandwidth after entering the connected state. Alternatively, when the first terminal apparatus receives the multicast information and/or is interested in the multicast information, the first terminal apparatus may send the third indication information to the network device, to indicate to the network device that the first terminal apparatus receives the multicast information and/or is interested in the multicast information. Correspondingly, after receiving the third indication information, the network device may send the second indication information to the first terminal apparatus, where the second indication information indicates that a bandwidth for service information reception by the first terminal apparatus after the first terminal apparatus enters the connected state is the second bandwidth, or indicates that the first terminal apparatus uses the second bandwidth for multicast information reception after entering the connected state. Correspondingly, when receiving the second indication information, the first terminal apparatus may determine, based on the second indication information, that the bandwidth for service information reception is the second bandwidth after the first terminal apparatus enters the connected state, or determine to receive the multicast information by using the second bandwidth after entering the connected state.

In another example, when the first terminal apparatus does not receive the multicast information and/or is not interested in the multicast information, the first terminal apparatus does not need to send the third indication information to the network device. Correspondingly, if the network device does not receive the third indication information, the network device may send the second indication information to the first terminal apparatus, where the second indication information indicates that a bandwidth for service information reception by the first terminal apparatus after the first terminal apparatus enters the connected state is the first bandwidth, or indicates that the first terminal apparatus uses the first bandwidth for unicast information reception after entering the connected state. Correspondingly, when receiving the second indication information, the first terminal apparatus may determine, based on the second indication information, that the bandwidth for service information reception is the first bandwidth after the first terminal apparatus enters the connected state, or determine to receive the unicast information by using the first bandwidth after entering the connected state. Alternatively, when the first terminal apparatus receives the multicast information and/or is interested in the multicast information, the first terminal apparatus may send the third indication information to the network device, to indicate to the network device that the first terminal apparatus receives the multicast information and/or is interested in the multicast information. Correspondingly, after receiving the third indication information, the network device may send the second indication information to the first terminal apparatus, where the second indication information indicates that a bandwidth for service information reception by the first terminal apparatus after the first terminal apparatus enters the connected state is the second bandwidth, or indicates that the first terminal apparatus uses the second bandwidth for multicast information reception after entering the connected state. Correspondingly, when receiving the second indication information, the first terminal apparatus may determine, based on the second indication information, that the bandwidth for service information reception is the second bandwidth after the first terminal apparatus enters the connected state, or determine to receive the multicast information by using the second bandwidth after entering the connected state.

In a specific implementation process, the third indication information may indicate, in different manners, whether the first terminal apparatus receives the multicast information after entering the connected state. For example, the indication manners may include but are not limited to the following several manners:

Manner 1: The third indication information may be a new IE or field. For example, the network device may determine, based on that the SIB1, other system information, a multicast logical channel, or the like includes the IE or the field, that the first terminal apparatus receives the multicast information. For example, an attribute of the new IE or field may be an enumerated type, for example, {true/false} is enumerated, or {supported/not supported} is enumerated, or enumeration may not be used. For example, the attribute of the new IE or field is that {true/false} is enumerated. If the network device determines that the attribute of the new IE or field is true, the network device may determine that the first terminal apparatus receives the multicast information; or if the network device determines that the attribute of the new IE or field is false, the network device may determine that the first terminal apparatus does not receive the multicast information.

Manner 2: The third indication information may be a 1-bit or 2-bit bitmap. For example, if the third indication information is the 1-bit bitmap, 0 may indicate that the first terminal apparatus does not receive the multicast information, and 1 may indicate that the first terminal apparatus receives the multicast information. Alternatively, if the third indication information is the 2-bit bitmap, the first bit may indicate whether the first terminal apparatus receives the unicast information, and the second bit may indicate whether the first terminal apparatus receives the multicast information.

Manner 3: The third indication information may be a character, a field, an RNTI, a TMGI, or the like. Specifically, when the third indication information is the character or the field, the character or the field may be but is not limited to: a character or a field in msg4 signaling, RRC signaling, RRC setup signaling, RRC resume signaling, or other signaling. When the third indication information is the RNTI, the RNTI may be a G-RNTI or the like. This is not limited in this embodiment of this application. When receiving the third indication information, the network device may determine, based on the third indication information, whether the first terminal apparatus receives the multicast information.

In this case, the first terminal apparatus determines, based on the second indication information, that the bandwidth for service information reception is the first bandwidth or the second bandwidth after the first terminal apparatus enters the connected state.

Optionally, in an implementation scenario of this embodiment of this application, after step S502, the method shown in FIG. 5 further includes step S503: After the first terminal apparatus enters the connected state, if the first terminal apparatus receives the multicast service, the first terminal apparatus may use the second bandwidth, or if the first terminal apparatus receives only the unicast information, that is, does not receive the multicast information, the first terminal apparatus may use the first bandwidth.

Step S503 is the same as step S403 in the embodiment shown in FIG. 4. For related descriptions, refer to the embodiment shown in FIG. 4. Details are not described herein again.

In this embodiment of this application, when receiving the multicast information after entering the connected state, the first terminal apparatus may determine, based on the second indication information, to use the second bandwidth; or when the first terminal apparatus receives only the unicast information after entering the connected state, the first terminal apparatus may determine, based on the second indication information, to use the first bandwidth. This can improve resource utilization, better satisfy requirements for multicast information transmission, and avoid a resource waste caused, by using the second bandwidth configured to receive the multicast information, by the first terminal apparatus that does not receive the multicast information.

It should be understood that, in embodiments of this application, the first terminal apparatus and the network device may perform some or all of the steps in embodiments of this application. These steps are merely examples. In embodiments of this application, other steps or variations of various steps may further be performed. In addition, the steps may be performed in a sequence different from a sequence presented in embodiments of this application, and not all the steps in embodiments of this application need to be performed.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

The foregoing mainly describes the solutions provided in embodiments of this application from a perspective of interaction between the first terminal apparatus and the network device by using an example in which two communication apparatuses are respectively the first terminal apparatus and the network device. It should be understood that, to implement the foregoing functions, the two communication apparatuses include hardware structures and/or software modules for performing corresponding functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method examples. For example, each function module may be obtained through division based on each function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 6:
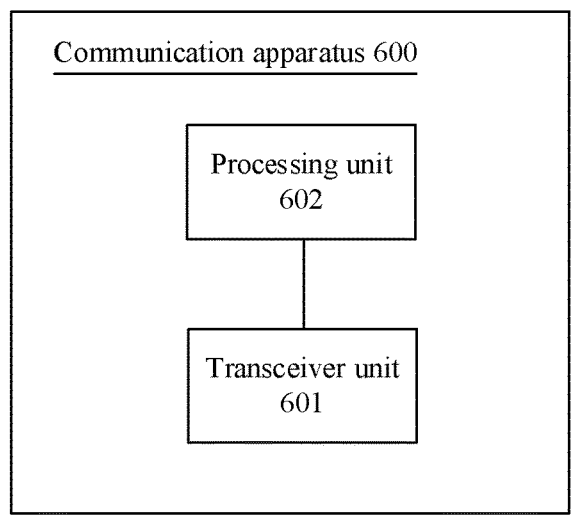
FIG. 6 is a schematic diagram of a structure of a communication apparatus according to an embodiment of this application.

When an integrated unit (module) is used, FIG. 6 is a schematic diagram of a structure of a communication apparatus according to an embodiment of this application. As shown in FIG. 6, the communication apparatus 600 may include a transceiver unit 601 and a processing unit 602.

The transceiver unit 601 is configured to support the communication apparatus 600 in communicating with another apparatus, for example, communicating with a network device. The processing unit 602 is configured to control and manage an action of the communication apparatus 600. For example, the processing unit 602 is configured to support the communication apparatus 600 in performing the processes S202 to S204 in FIG. 2 and the processes S302 to S304 in FIG. 3, and/or another process of the technology described in this specification. Optionally, the transceiver unit 601 may be a sending unit when sending information, and the transceiver unit 601 may be a receiving unit when receiving information. Specifically, refer to the following description:

The transceiver unit 601 is configured to receive first indication information from a network device; and determine a first bandwidth of a first bandwidth part BWP based on the first indication information, where the first BWP is for receiving first multicast information, and the first bandwidth is a bandwidth configured in a MIB or a SIB1.

The processing unit 602 is configured to receive the first multicast information on the first bandwidth.

In a possible design, when determining the first bandwidth of the first BWP based on the first indication information, the transceiver unit 601 may be specifically configured to: if the first indication information indicates that a bandwidth of a first CORESET is greater than a bandwidth of a CORESET0, determine that the first bandwidth is the bandwidth configured in the SIB1; or if the first indication information indicates that a bandwidth of a first CORESET is less than or equal to a bandwidth of a CORESET0, determine that the first bandwidth is the bandwidth configured in the MIB, where the first CORESET is configured in system information.

In a possible design, when determining the first bandwidth of the first BWP based on the first indication information, the transceiver unit 601 may be specifically configured to: determine, based on the first indication information, that the first bandwidth is the bandwidth configured in the MIB or the SIB1, where the first indication information includes a correspondence between the first multicast information and a receive bandwidth or between intra-cell multicast information and a receive bandwidth.

It should be understood that operations and/or functions of the modules in the communication apparatus 600 are separately used to implement corresponding procedures of the multicast information receiving method shown in FIG. 2 and FIG. 3. For brevity, details are not described herein again.

Figure 7:
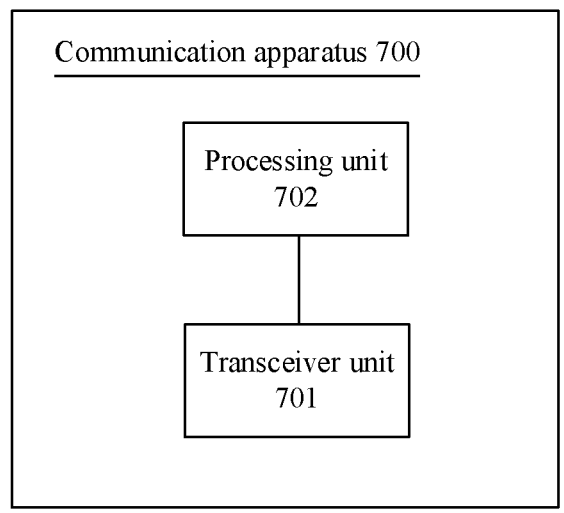
FIG. 7 is a schematic diagram of a structure of a communication apparatus according to an embodiment of this application.

When an integrated unit (module) is used, FIG. 7 is a schematic diagram of a structure of a communication apparatus according to an embodiment of this application. As shown in FIG. 7, the communication apparatus 700 may include a transceiver unit 701.

The transceiver unit 701 is configured to support the communication apparatus 700 in communicating with another apparatus, for example, communicating with a first terminal apparatus. Optionally, the transceiver unit 701 may be a sending unit when sending information, and the transceiver unit 701 may be a receiving unit when receiving information. Optionally, the communication apparatus 700 may further include a processing unit 702, configured to control and manage an action of the communication apparatus 700. For example, the processing unit 702 is configured to support the communication apparatus 700 in performing steps performed by the communication apparatus 700 in the solutions provided in embodiments of this application. Specifically, refer to the following description:

The transceiver unit 701 is configured to send first indication information to a first terminal apparatus, where the first indication information is for determining a first bandwidth of a first BWP, the first BWP is for receiving first multicast information, and the first bandwidth is a bandwidth configured in a master information block MIB or a system information block SIB1.

In a possible design, the first indication information indicates that if a bandwidth of a first control resource set CORESET is greater than a bandwidth of a CORESET0, the first bandwidth is the bandwidth configured in the SIB1; or if the first indication information indicates that a bandwidth of a first CORESET is less than or equal to a bandwidth of a CORESET0, the first bandwidth is the bandwidth configured in the MIB, where the first CORESET is configured in system information.

In a possible design, the first indication information includes a correspondence between the first multicast information and a receive bandwidth or between intra-cell multicast information and a receive bandwidth.

It should be understood that operations and/or functions of the modules in the communication apparatus 700 are separately used to implement corresponding procedures of the multicast information receiving method shown in FIG. 2 and FIG. 3. For brevity, details are not described herein again.

Figure 8:
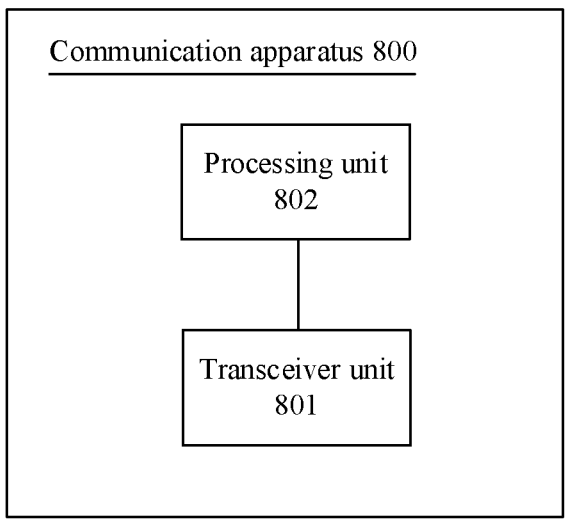
FIG. 8 is a schematic diagram of a structure of a communication apparatus according to an embodiment of this application.

When an integrated unit (module) is used, FIG. 8 is a schematic diagram of a structure of a communication apparatus according to an embodiment of this application. As shown in FIG. 8, the communication apparatus 800 may include a transceiver unit 801 and a processing unit 802.

The transceiver unit 801 is configured to support the communication apparatus 800 in communicating with another apparatus, for example, communicating with a network device. The processing unit 802 is configured to control and manage an action of the communication apparatus 800. For example, the processing unit 802 is configured to support the communication apparatus 800 in performing the processes S402 and S403 in FIG. 4 and the processes S502 and S503 in FIG. 5, and/or another process of the technology described in this specification. Optionally, the transceiver unit 801 may be a sending unit when sending information, and the transceiver unit 801 may be a receiving unit when receiving information. Specifically, refer to the following description:

The transceiver unit 801 is configured to receive second indication information from a network device, where the second indication information indicates the communication apparatus 800 to use a first bandwidth or a second bandwidth after the communication apparatus 800 enters a connected state, the first bandwidth is a bandwidth of an initial BWP configured in a SIB1, and the second bandwidth is a bandwidth configured to receive multicast information and is configured in the SIB1.

The processing unit 802 is configured to determine, based on the second indication information, that the bandwidth of the initial BWP is the first bandwidth or the second bandwidth.

In a possible design, the transceiver unit 801 is further configured to: before receiving the second indication information, send third indication information to the network device, where the third indication information indicates whether the communication apparatus 800 receives the multicast information.

It should be understood that operations and/or functions of the modules in the communication apparatus 800 are separately used to implement corresponding procedures of the indication information sending/receiving method shown in FIG. 4 and FIG. 5. For brevity, details are not described herein again.

Figure 9:
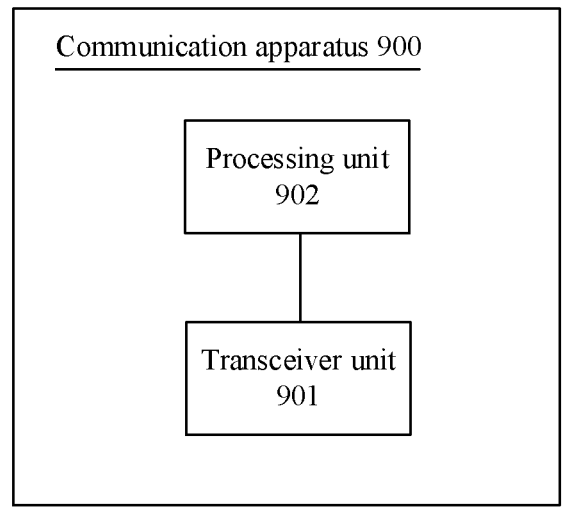
FIG. 9 is a schematic diagram of a structure of a communication apparatus according to an embodiment of this application.

When an integrated unit (module) is used, FIG. 9 is a schematic diagram of a structure of a communication apparatus according to an embodiment of this application. As shown in FIG. 9, the communication apparatus 900 may include a transceiver unit 901.

The transceiver unit 901 is configured to support the communication apparatus 900 in communicating with another apparatus, for example, communicating with a first terminal apparatus. Optionally, the transceiver unit 901 may be a sending unit when sending information, and the transceiver unit 901 may be a receiving unit when receiving information. Optionally, the communication apparatus 900 may further include a processing unit 902, configured to control and manage an action of the communication apparatus 900. For example, the processing unit 902 is configured to support the communication apparatus 900 in performing steps performed by the communication apparatus 900 in the solutions provided in embodiments of this application. Specifically, refer to the following description:

The transceiver unit 901 is configured to send second indication information to a first terminal apparatus, where the second indication information indicates the first terminal apparatus to use a first bandwidth or a second bandwidth after the first terminal apparatus enters a connected state, the first bandwidth is a bandwidth of an initial BWP configured in a SIB1, and the second bandwidth is a bandwidth configured to receive multicast information and is configured in the SIB1.

In a possible design, the transceiver unit 901 is further configured to: before sending the second indication information, receive third indication information from the first terminal apparatus, where the third indication information indicates whether the first terminal apparatus receives the multicast information.

It should be understood that operations and/or functions of the modules in the communication apparatus 900 are separately used to implement corresponding procedures of the indication information sending/receiving method shown in FIG. 4 and FIG. 5. For brevity, details are not described herein again.

It should be understood that when the communication apparatuses shown in FIG. 6 and FIG. 8 are terminal apparatuses or user equipment, and the communication apparatuses shown in FIG. 7 and FIG. 9 are network apparatuses or network devices, the transceiver unit 601, the transceiver unit 701, the transceiver unit 801, and the transceiver unit 901 may be transceivers or the like. The transceiver unit 601, the transceiver unit 701, the transceiver unit 801, and the transceiver unit 901 may be transmitters when sending information. The transceiver unit 601, the transceiver unit 701, the transceiver unit 801, and the transceiver unit 901 may be receivers when receiving information. The transceiver, the transmitter, or the receiver may be a radio frequency circuit. When the communication apparatuses shown in FIG. 6 to FIG. 9 are chips, the transceiver unit 601, the transceiver unit 701, the transceiver unit 801, and the transceiver unit 901 may be input and/or output interfaces, pins, circuits, or the like.

Figure 10:
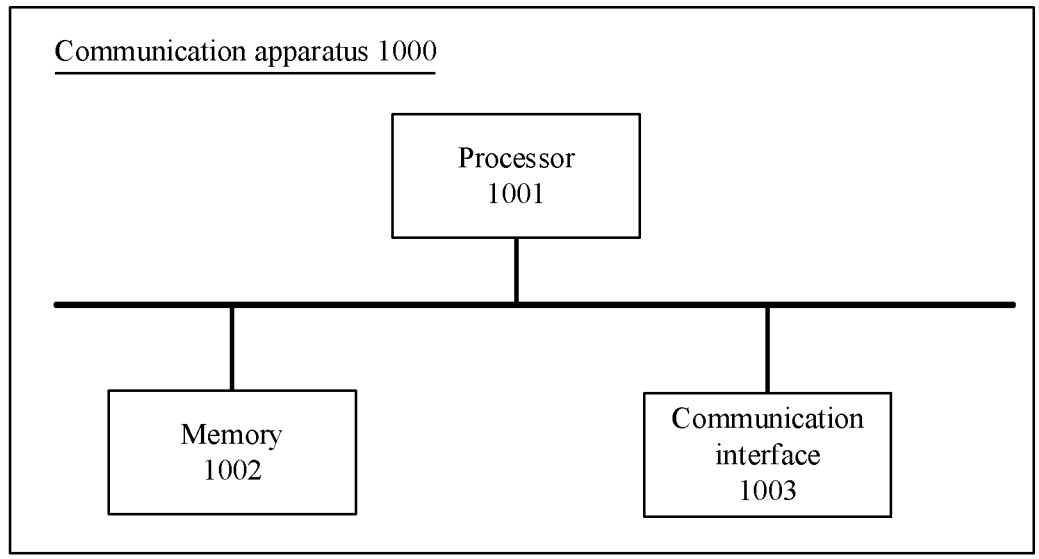
FIG. 10 is a schematic diagram of a structure of a communication apparatus according to an embodiment of this application.

When an integrated unit (module) is used, FIG. 10 is a schematic diagram of a structure of a communication apparatus according to an embodiment of this application. The communication apparatus 1000 may be the first terminal apparatus or the network device in the foregoing embodiments. The communication apparatus 1000 includes a processor 1001, a memory 1002, and a communication interface 1003. The processor 1001 may be one or more processors. The communication interface 1003 uses any apparatus such as a transceiver, and is configured to communicate with another device or a communication network such as an Ethernet, a radio access network (RAN), a wireless local area network (WLAN), or a wired access network. The memory 1002 is configured to store computer-executable instructions for performing the solutions in this application, and the processor 1001 controls execution. The processor 1001 is configured to execute the computer-executable instructions stored in the memory 1002, so that any one of the possible embodiments of the multicast information receiving method shown in FIG. 2 and FIG. 3 and any one of the possible embodiments of the indication information sending/receiving method shown in FIG. 4 and FIG. 5 can be implemented, and/or is configured to implement another embodiment described in this specification.

Figure 11:
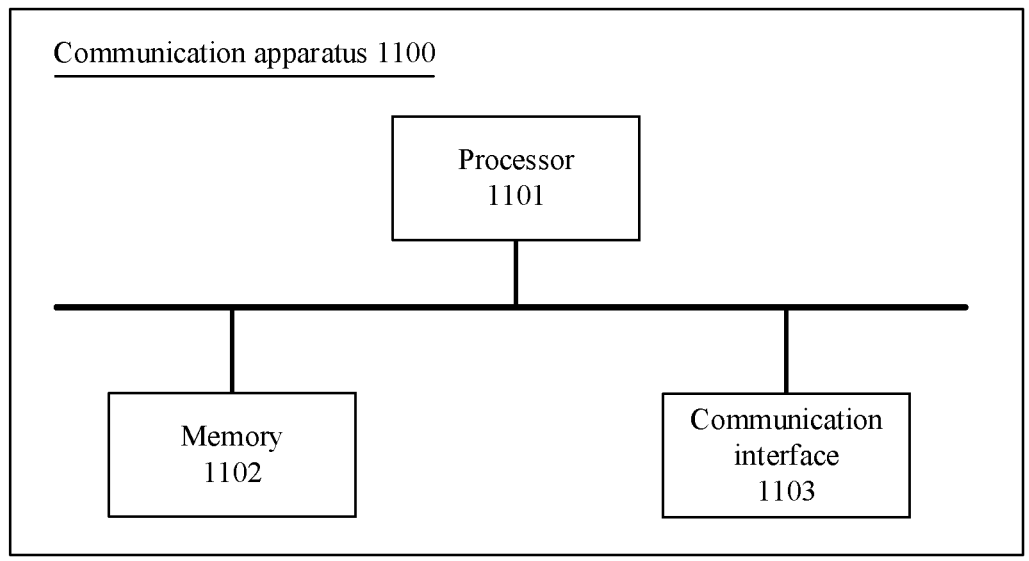
FIG. 11 is a schematic diagram of a structure of a communication apparatus according to an embodiment of this application.

When an integrated unit (module) is used, FIG. 11 is a schematic diagram of a structure of a communication apparatus according to an embodiment of this application. As shown in FIG. 11, the communication apparatus 1100 may include at least one processor 1101 and a memory 1102. The memory 1102 stores one or more computer programs, for example, is configured to store one or more computer programs necessary for the communication apparatus 1100. In addition, the communication apparatus 1100 may further include a communication interface 1103. The communication interface 1103 may use any apparatus such as a transceiver, and is configured to communicate with another device or a communication network, for example, an Ethernet, a RAN, a WLAN, or a wired access network. The at least one processor 1101 is configured to support the communication apparatus 1100 in implementing the multicast information receiving method and the indication information sending/receiving method. For example, when one or more computer programs stored in the memory 1102 are executed by the at least one processor 1101, the communication apparatus 1100 may implement any one of the possible embodiments of the multicast information receiving method shown in FIG. 2 and FIG. 3, and implement any one of the possible embodiments of the indication information sending/receiving method shown in FIG. 4 and FIG. 5, and/or configured to implement another embodiment described in this specification.

Based on a same concept as the foregoing method embodiments, an embodiment of this application further provides a communication apparatus. The receiving apparatus includes at least one processor. The at least one processor is configured to be coupled to a memory (where the memory may be an internal or external memory of the communication apparatus), and after reading computer program instructions in the memory, execute the computer program instructions to implement any one of the possible embodiments of the multicast information receiving method shown in FIG. 2 and FIG. 3, and any one of the possible embodiments of the indication information sending/receiving method shown in FIG. 4 and FIG. 5, and/or configured to implement another embodiment described in this specification.

Based on a same concept as the foregoing method embodiments, an embodiment of this application further provides a communication apparatus. The communication apparatus includes one or more processors, and one or more memories or non-volatile storage media. The one or more processors are connected to the one or more memories or non-volatile storage media. The one or more memories or non-volatile storage media store computer instructions or a computer program. When the one or more processors execute the computer instructions or the computer program, any one of the possible embodiments of the multicast information receiving method shown in FIG. 2 and FIG. 3 and any one of the possible embodiments of the indication information sending/receiving method shown in FIG. 4 and FIG. 5 may be implemented, and/or another embodiment described in this specification may be implemented.

Based on a same concept as the foregoing method embodiments, an embodiment of this application further provides a computer-readable storage medium or a non-volatile storage medium. The computer-readable storage medium or the non-volatile storage medium stores computer instructions or a computer program. When the computer instructions or the computer program are or is run on a computer, the computer is enabled to perform any one of the multicast information receiving method embodiments or the possible implementations of the method embodiments. When the computer instructions or the computer program are or is run on one or more processors, the communication apparatus including the one or more processors is enabled to perform any one of the embodiments of the multicast information receiving method, the embodiments of the indication information sending/receiving method, or the possible implementations of the method, for example, perform any step of the embodiments of the multicast information receiving method shown in FIG. 2 and FIG. 3, perform any step of the embodiments of the indication information sending/receiving method shown in FIG. 4 and FIG. 5, and/or perform another process of the technology described in this specification.

Based on a same concept as the foregoing method embodiments, an embodiment of this application further provides a program product. The computer program product configured to store a computer program. When the computer program is run on a computer, the computer is enabled to perform any one of the embodiments of the multicast information receiving method, the embodiments of the indication information sending/receiving method, or the possible implementations of the method embodiments, for example, perform any step of the embodiments of the multicast information receiving method shown in FIG. 2 and FIG. 3, perform any step of the embodiments of the indication information sending/receiving method shown in FIG. 4 and FIG. 5, and/or perform another process of the technology described in this specification.

Based on a same concept as the foregoing method embodiments, an embodiment of this application further provides a chip or an indication information transmission apparatus, including at least one processor. The at least one processor is coupled to a memory, the memory is configured to store computer instructions, and the at least one processor runs the computer instructions to enable the chip or the indication information transmission apparatus to perform any one of the embodiments of the multicast information receiving method, the embodiments of the indication information sending/receiving method, or the possible implementations of the method embodiments, for example, perform any step of the embodiments of the multicast information receiving method shown in FIG. 2 and FIG. 3, perform any step of the embodiments of the indication information sending/receiving method shown in FIG. 4 and FIG. 5, and/or perform another process of the technology described in this specification.

Based on a same concept as the foregoing method embodiments, an embodiment of this application further provides a chip. The chip may include at least one processor and an interface. The interface may be a code/data read/write interface. The interface is configured to provide computer-executable instructions (the computer-executable instructions are stored in a memory, and may be directly read from the memory, or may pass through another component) for the at least one processor. The at least one processor is configured to execute the computer-executable instructions, to perform any one of the embodiments of the multicast information receiving method, the embodiments of the indication information sending/receiving method, or the possible implementations of the method embodiments, for example, perform any step of the embodiments of the multicast information receiving method shown in FIG. 2 and FIG. 3, perform any step of the embodiments of the indication information sending/receiving method shown in FIG. 4 and FIG. 5, and/or perform another process of the technology described in this specification.

It should be noted that, the processor (the processor shown in FIG. 10 and FIG. 11) in embodiments of this application may be an integrated circuit chip and has a signal processing capability. In an implementation process, steps of the multicast information receiving method embodiments may be completed using a hardware integrated logical circuit in the processor, or using instructions in a form of software. The processor may be a general-purpose central processing unit (CPU), a general-purpose processor, digital signal processor (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It should be understood that the memory (the memory shown in FIG. 10 and FIG. 11) in embodiments of this application may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the system and methods described in this application includes but is not limited to these and any memory of another appropriate type.

Various illustrative logic units and circuits described in embodiments of this application may implement or operate the described functions by using a general-purpose processor, a digital signal processor, an application-specific integrated circuit (ASIC), a field programmable gate array (FPGA), or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable disk, a CD-ROM, or any other storage medium in the art. For example, the storage medium may be connected to a processor, so that the processor may read information from the storage medium and write information to the storage medium. Optionally, the storage medium may be integrated into the processor. The processor and the storage medium may be disposed in an ASIC. The ASIC may be disposed in a communication apparatus, for example, may be disposed in different components in the communication apparatus.

All or some of the foregoing embodiments may be implemented using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state disk (SSD).

Embodiments of this application are described with reference to the flowcharts and/or block diagrams of the method, the apparatus, and the computer program product according to embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although embodiments of this application are described with reference to specific features, it is clear that various modifications and combinations may be made to them without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application.

What is claimed is:

1. A method, comprising:
receiving a master information block (MIB), wherein a bandwidth configured by the MIB is same as a bandwidth of a control resource set 0 (CORESET0);
receiving a system information block (SIB1) on the bandwidth configured by the MIB, wherein a bandwidth configured by the SIB1 is larger than or equal to the bandwidth of the CORESET0 and covers the CORESET0 in frequency domain;
receiving first indication information, wherein the first indication information indicates a first bandwidth of a first bandwidth part for receiving first multicast information;
determining, based on the first indication information, the first bandwidth of the first bandwidth part is the bandwidth configured in the MIB, or is the bandwidth configured in the SIB1; or is a bandwidth configured by a network device for terminal apparatus and that is for multicast information reception; and
receiving the first multicast information on the first bandwidth of the first bandwidth part.

2. The method according to claim 1, wherein the first indication information is carried in system information other than the SIB1.

3. The method according to claim 1, wherein the receiving the first multicast information comprises:
receiving the first multicast information in a non-connected state, and the non-connected state comprises at least one of an idle state or an inactive state.

4. The method according to claim 1, wherein the first bandwidth part is consecutive frequency resources.

5. The method according to claim 1, wherein the method further comprises:
receiving a paging message or system information on the bandwidth of the CORESET0 configured by the MIB when no longer receives the first multicast information.

6. The method according to claim 1, wherein the method further comprises:
acquiring first information, wherein the first information is carried in the SIB1, or the first information is carried in system information other than the SIB1, and
wherein the first information indicates that a CORESET corresponding to the first bandwidth of the first bandwidth part is the CORESET0, wherein the CORESET corresponding to the first bandwidth of the first bandwidth part is for listening to control information.

7. The method according to claim 1, wherein the method further comprises:
acquiring first information, wherein the first information is carried in the SIB1, or the first information is carried in system information other than the SIB1, and
wherein the first information indicates that a CORESET corresponding to the first bandwidth of the first bandwidth part is a first CORESET, wherein the first CORESET is less than or equal to the first bandwidth of the first bandwidth part, the first CORESET is larger than the bandwidth of the CORESET0, and the first CORESET is for listening to control information.

8. The method according to claim 1, wherein:
the bandwidth configured in the MIB is the bandwidth of an initial bandwidth part (BWP) configured in the MIB, the bandwidth configured in the SIB1 is the bandwidth of an initial downlink BWP configured in the SIB1.

9. An apparatus, comprising:
one or more processors; and
a non-transitory storage medium storing program instructions that, when executed by the one or more processors, cause the apparatus to perform operations including:
receiving a master information block (MIB), wherein a bandwidth configured by the MIB is same as a bandwidth of a control resource set 0 (CORESET0);
receiving a system information block (SIB1) on the bandwidth configured by the MIB, wherein a bandwidth configured by the SIB1 is larger than or equal to the bandwidth of the CORESET0 and covers the CORESET0 in frequency domain;
receiving first indication information, wherein the first indication information indicates a first bandwidth of a first bandwidth part for receiving first multicast information;
determining, based on the first indication information, the first bandwidth of the first bandwidth part is the bandwidth configured in the MIB, or is the bandwidth configured in the SIB1; or is a bandwidth configured by a network device for the apparatus and that is for multicast information reception; and
receiving the first multicast information on the first bandwidth of the first bandwidth part.

10. The apparatus according to claim 9, wherein the first indication information is carried in system information other than the SIB1.

11. The apparatus according to claim 9, wherein the receiving the first multicast information comprises:
receiving the first multicast information in a non-connected state of the apparatus, and the non-connected state comprises at least one of an idle state or an inactive state.

12. The apparatus according to claim 9, wherein the first bandwidth part is consecutive frequency resources.

13. The apparatus according to claim 9, the operations further comprising:
receiving a paging message or system information on the bandwidth of the CORESET0 configured by the MIB when the apparatus no longer receives the first multicast information.

14. The apparatus according to claim 9, wherein the operations further comprise:
acquiring first information, wherein the first information is carried in the SIB1, or the first information is carried in system information other than the SIB1, and
wherein the first information indicates that a CORESET corresponding to the first bandwidth of the first bandwidth part is the CORESET0, wherein the CORESET corresponding to the first bandwidth of the first bandwidth part is for listening to control information.

15. The apparatus according to claim 9, wherein the operations further comprise:
acquiring first information, wherein the first information is carried in the SIB1, or the first information is carried in system information other than the SIB1, and
wherein the first information indicates that a CORESET corresponding to the first bandwidth of the first bandwidth part is a first CORESET, wherein the first CORESET is less than or equal to the first bandwidth of the first bandwidth part, the first CORESET is larger than the bandwidth of the CORESET0, and the first CORESET is for listening to control information.

16. The apparatus according to claim 9, wherein:
the bandwidth configured in the MIB is the bandwidth of an initial bandwidth part (BWP) configured in the MIB, the bandwidth configured in the SIB1 is the bandwidth of an initial downlink BWP configured in the SIB1.

17. A non-transitory computer-readable storage medium storing executable instructions, wherein the executable instructions, when executed by an apparatus, cause the apparatus to perform operations including:
receiving a master information block (MIB), wherein a bandwidth configured by the MIB is same as a bandwidth of a control resource set 0 (CORESET0);
receiving a system information block (SIB1) on the bandwidth configured by the MIB, wherein a bandwidth configured by the SIB1 is larger than or equal to the bandwidth of the CORESET0 and covers the CORESET0 in frequency domain;
receiving first indication information, wherein the first indication information indicates a first bandwidth of a first bandwidth part for receiving first multicast information;
determining, based on the first indication information, the first bandwidth of the first bandwidth part is the bandwidth configured in the MIB, or is the bandwidth configured in the SIB1; or is a bandwidth configured by a network device for the apparatus and that is for multicast information reception; and
receiving the first multicast information on the first bandwidth of the first bandwidth part.

18. The non-transitory computer-readable storage medium according to claim 17, wherein the first indication information is carried in system information other than the SIB1.

19. The non-transitory computer-readable storage medium according to claim 17, wherein the receiving the first multicast information comprises:
receiving the first multicast information in a non-connected state of the apparatus, and the non-connected state comprises at least one of an idle state or an inactive state.

20. The non-transitory computer-readable storage medium according to claim 17, wherein the first bandwidth part is consecutive frequency resources.

21. The non-transitory computer-readable storage medium according to claim 17, the operations further comprising:
receiving a paging message or system information on the bandwidth of the CORESET0 configured by the MIB when the apparatus no longer receives the first multicast information.

* * * * *